(12) United States Patent
Hara et al.

(10) Patent No.: US 7,536,779 B2
(45) Date of Patent: May 26, 2009

(54) METHOD OF MANUFACTURING MAGNETIC HEAD

(75) Inventors: Tatsuo Hara, Shimosuwa-machi (JP);
Toshiaki Yanagisawa, Suwa (JP);
Hiroyuki Kojima, Matsumoto (JP);
Eiichi Nagasaka, Minowa-machi (JP);
Kenichi Michibata, Okaya (JP);
Yoshiaki Oguchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 484 days.

(21) Appl. No.: 11/033,854

(22) Filed: Jan. 13, 2005

(65) Prior Publication Data

US 2005/0152063 A1 Jul. 14, 2005

(30) Foreign Application Priority Data

| Jan. 13, 2004 | (JP) | ............................. 2004-005835 |
| Mar. 22, 2004 | (JP) | ............................. 2004-082710 |
| Nov. 29, 2004 | (JP) | ............................. 2004-344589 |

(51) Int. Cl.
*G11B 5/127* (2006.01)
*H04R 31/00* (2006.01)

(52) U.S. Cl. .................. 29/606; 29/602.1; 29/604; 29/605; 29/609; 156/89.11; 156/89.12; 156/250; 336/176; 336/200; 336/229

(58) Field of Classification Search ............... 29/592.1, 29/602.1, 604, 606, 607, 609; 156/89.11, 156/89.12, 250; 336/176, 200, 229

See application file for complete search history.

(56) References Cited

U.S. PATENT DOCUMENTS

| 4,947,179 A | 8/1990 | Ganter et al. |
| 5,271,777 A * | 12/1993 | Duffy ......................... 148/537 |

FOREIGN PATENT DOCUMENTS

| EP | 0905587 A | 3/1999 |
| EP | 1349236 A1 | 9/2001 |
| EP | 1349236 A | 10/2003 |
| JP | 59213022 A * | 12/1984 |
| JP | 63070916 A * | 3/1988 |
| JP | 2003-110341 A | 4/2003 |
| JP | 2003-110341 A | 8/2003 |
| JP | 2004-179803 A | 6/2004 |

* cited by examiner

*Primary Examiner*—Paul D Kim
(74) *Attorney, Agent, or Firm*—Global IP Counselors, LLP

(57) ABSTRACT

A magnetic core portion 16, a residual base material portion 42, and a connecting portion 43 are formed by pressing from a base material 40. Notches 18A are formed at a peripheral edge of the magnetic core portion 16, which is bent in the direction of the plate thickness to form a temporary fixing portion 18. When base materials 40 are overlapped to cut the magnetic core portions 16 from the connecting portion 43, the magnetic core portions 16 are pressed in directions toward one another so that the temporary fixing portion 18 is filled between notches 18A in the other magnetic core portion 16, to fix temporarily the other magnetic core portions 16. Since the magnetic core portions 16 are temporarily and simultaneously fixed by pressing in a cutting step normally carried out, the magnetic core portions can be temporarily fixed with ease.

23 Claims, 19 Drawing Sheets

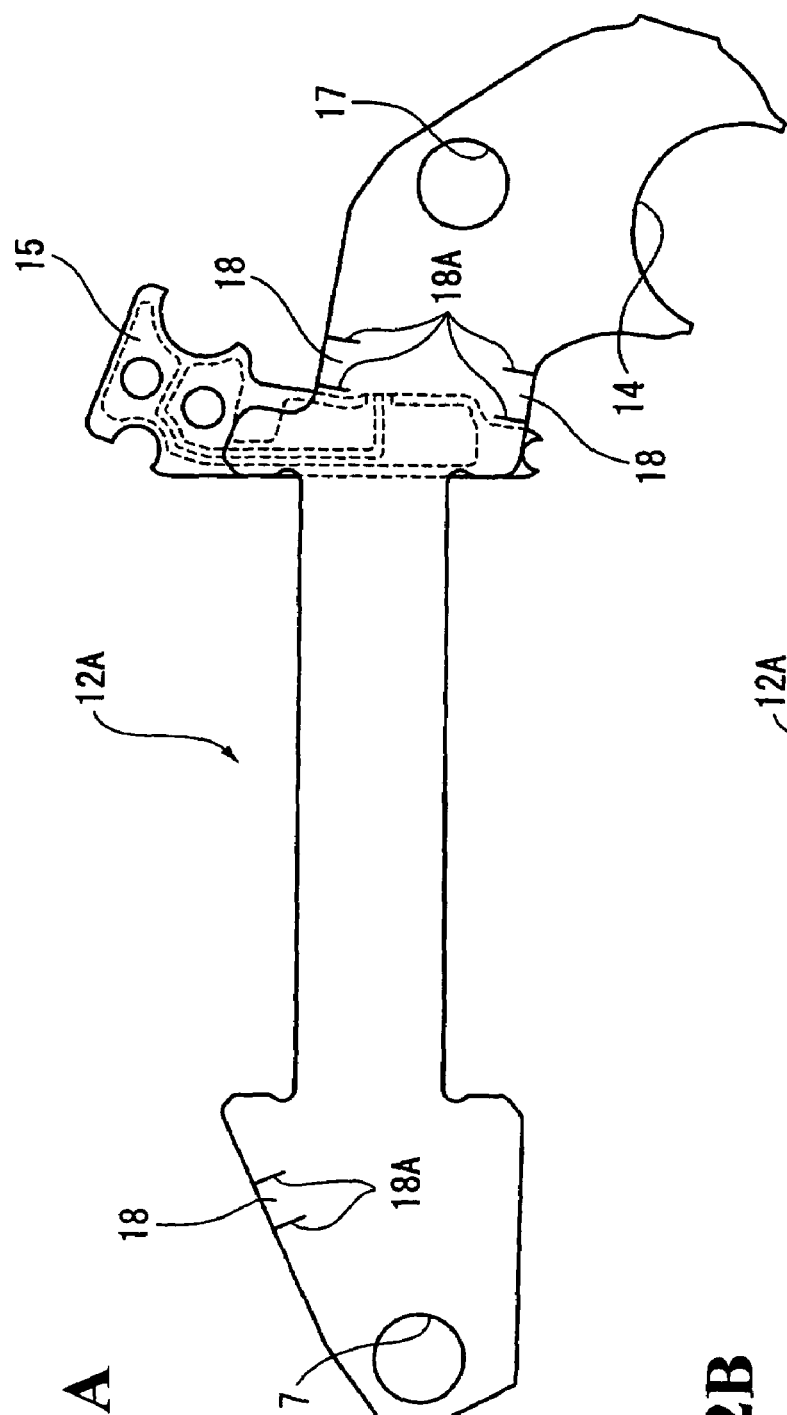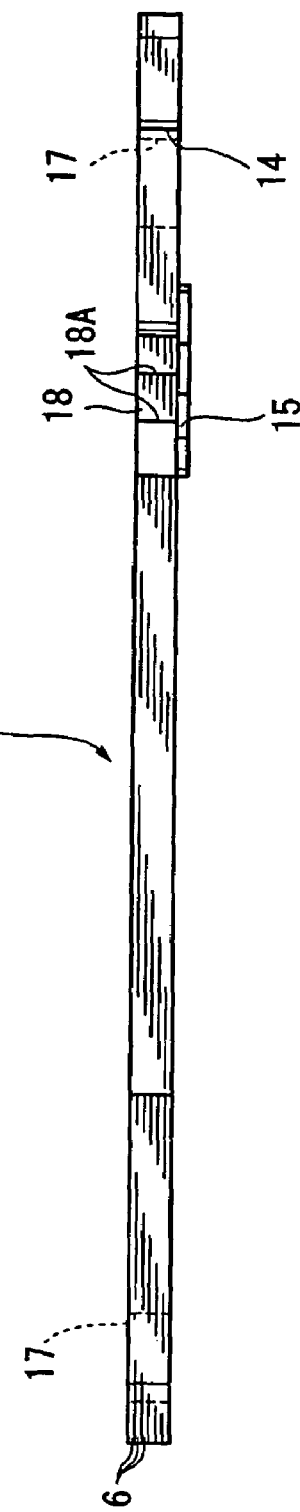
FIG. 2A
FIG. 2B

METHOD OF MANUFACTURING MAGNETIC HEAD

BACKGROUND OF THE INVENTION

1. Field of the Invention

The present invention generally relates to a method of manufacturing a magnetic core. More specifically, the present invention relates to a method of manufacturing a magnetic core composed of an amorphous metal, the magnetic core, an electromagnetic transducer, a timepiece, and an electronic device.

2. Background Information

Examples of magnetic cores utilized for a stator core of a stepping motor and a core of an antenna include one formed by laminating a plurality of amorphous thin materials and fixing them to one another as shown, for example, in Japanese Unexamined Patent Application No. 2003-110341, the entire disclosure of which is hereby incorporated by reference. The magnetic core in the patent application is used as a core of an antenna in a radio controlled timepiece. A coil is wound around parts excluding both ends of laminated magnetic cores to form the antenna. When the antenna having such a structure is manufactured, the laminated magnetic cores are temporarily fixed by winding an insulating film around coil core portions of the magnetic cores, and are adhesively fixed to one another by impregnating areas among the magnetic cores with adhesives such as thermosetting plastics and heating the adhesives.

In such a laminating and temporary fixing method, magnetic cores must be temporarily fixed sufficiently strongly in order to ensure adhesive properties of the magnetic cores so that the strength of an insulating film is required. In order to ensure the strength of the insulating film, however, the insulating film must be thickly wound around a coil core winding portion. Therefore, the winding efficiency of the coil may, in some cases, be reduced. Further, it takes a lot of time to wind the insulating film. Particularly when the antenna is used for a small product such as a portable timepiece, and the magnetic core also is small. Therefore, the insulating film is difficult to wind, resulting in an inferior ability to be handled.

In view of the above, it will be apparent to those skilled in the art from this disclosure that there exists a need for an improved method of manufacturing a magnetic core, a magnetic core, electromagnetic transducer, timepiece, and electronic device. This invention addresses this need in the art as well as other needs, which will become apparent to those skilled in the art from this disclosure.

SUMMARY OF THE INVENTION

An object of the present invention is to provide a magnetic core manufacturing method capable of temporarily fixing a magnetic core with ease and achieving high efficiency in manufacturing steps, the magnetic core manufactured by the magnetic core manufacturing method, an electromagnetic transducer having the magnetic core, a timepiece having the electromagnetic transducer, and an electronic device having the electromagnetic transducer.

A magnetic core manufacturing method according to the present invention is a method of manufacturing a magnetic core constructed by laminating a plurality of base materials formed of a plate material composed of an amorphous metal. The method includes a magnetic core portion forming step for forming a magnetic core portion in the shape of the magnetic core by pressing from the base material; a temporary fixing portion forming step for forming a temporary fixing portion to fix temporarily the laminated magnetic core portions; and a temporary fixing step for laminating and pressing the plurality of base materials to fix temporarily the magnetic core portions by the temporary fixing portion together with the pressing during the magnetic core portion forming step.

According to the present invention, the temporary fixing step is conducted together with (or simultaneously with) the pressing for forming the magnetic core portion in the magnetic core portion forming step. Therefore, the necessity of specially providing a separate temporary fixing step, as in conventional methods in which an insulating film is wound, is eliminated, thereby simplifying the manufacturing steps. This makes the manufacturing steps more efficient.

Furthermore, the temporary fixing portion is formed in the magnetic core portion, and the laminated magnetic core portions are temporarily fixed by the temporary fixing portion, thereby eliminating the necessity of extraneous materials such as the insulating film in the conventional example. Therefore, the manufacturing cost is reduced, and the temporary fixing is simplified.

In the present invention, it is desirable that the magnetic core portion forming step is carried out by forming a residual base material portion formed of the base material remaining around the magnetic core portion and a connecting portion to connect the magnetic core portion and the residual base material portion in addition to the magnetic core portion. It is also desirable that the temporary fixing is simultaneously performed in a cutting step to cut off the connecting portion from the magnetic core portion.

According to the present invention, in the magnetic core portion forming step, the residual base material portion and the connecting portion are formed around the magnetic core portion. Even in cases such as conveyance of the magnetic core portion, therefore, the residual base material portion may be also gripped and handled. Therefore, damage to the magnetic core portion is prevented, resulting in a greater ability to handle the residual base material portion. This is particularly useful for cases such as a case in which the magnetic core portion is small and difficult to handle. Further, the magnetic core portions are temporarily fixed in the cutting step to cut off the magnetic core portion from the base material. Therefore, the temporary fixing is performed in a stage close to the final stage of the magnetic core portion forming step so that the plurality of magnetic core portions are respectively and separately handled in the preceding stages, thereby increasing the degree of freedom in handling. The lamination and the temporary fixing have already been performed at the same time that the magnetic core portions have been cut out, thereby making it easy to handle the magnetic core portions in the subsequent manufacturing steps.

In the present invention, it is desirable that the magnetic core portion forming step is carried out by laminating the plurality of base materials and pressing the laminated base materials. According to the present invention, the magnetic core portion forming step is carried out by laminating the plurality of base materials, thereby making the manufacturing steps more efficient. In this case, a plurality of sets of magnetic core portions, which have been laminated and pressed, are further laminated and are temporarily fixed.

In the present invention, it is desirable that the magnetic core manufacturing method includes a coating step to coating both or one surface of the base material with adhesives before the magnetic core portion forming step.

According to the present invention, both or one of the surfaces of the base material are/is coated with the adhesives in the coating step so that the magnetic core portions are laminated and temporarily fixed by the temporary fixing. The adhesives are automatically interposed among the laminated magnetic core portions. Therefore, this also allows the manufacturing steps to be simplified.

In the present invention, it is desirable that the coating step is carried out by coating one of the surfaces of the base material with the adhesives. It is preferable that the one surface has a higher surface accuracy.

According to the present invention, the surface having the higher surface accuracy of the two surfaces of the base material is coated with the adhesives so that the surface is more uniformly coated with the adhesives, resulting in better adhesive properties of the magnetic core portions. This allows the performance of an amorphous magnetic substance to be satisfactorily exhibited without being degraded.

In the present invention, it is desirable that the coating step is carried out by coating the base material with the adhesives such that the adhesives have a thickness of 1 to 15 μm. According to the present invention, the thickness of the adhesives are suitably set. Therefore, the laminated magnetic core portions are satisfactorily bonded without degrading the performance of the amorphous magnetic substance.

According to the present invention, it is desirable that in the magnetic core portion forming step a burr due to blanking in the pressing is formed on the surface coated with the adhesives. According to the present invention, the pressing direction in the pressing is set such that the burr is formed on the surface coated with the adhesives. Therefore, the burr due to the pressing is always formed on the coated surface. Accordingly, the variation in thickness among the magnetic core portions by the burr can be absorbed by the thickness of the adhesives on the coated surface so that the magnetic core portions have a stable thickness. On the other hand, an amount of the thickness of the magnetic core portion by the burr is absorbed by the thickness of the adhesives. Even when the magnetic core portions are laminated, therefore, the thinning of the magnetic core is promoted.

In the present invention, it is desirable that the magnetic core portion forming step is carried out by arranging the surface, coated with the adhesives in the coating step, opposite to a die provided for the pressing. According to the present invention, when on the sides of a punch and a die for the pressing, the pressing is performed with the surface coated with the adhesives opposed to the die, the burr due to the pressing is always formed on the surface on the fixed side. Consequently, the management of the thickness of the magnetic core portion is simplified. In cases such as a case in which the residual base material portion is formed in the periphery of the magnetic core portions by blanking the periphery by the pressing, for example, the surface coated with the adhesives is on the side of the die so that the burr due to the pressing is always formed on the coated surface. Therefore, the thinning of the magnetic core portion is promoted.

In the present invention, it is desirable that the temporary fixing portion forming step is carried out by forming the temporary fixing portion in such a shape that it can be caulked or fitted to the magnetic core portion. According to the present invention, the temporary fixing portion is formed in such a shape that it can be caulked or fitted to the magnetic core portion. In the case of the temporary fixing, therefore, the laminated magnetic core portions are temporarily fixed in a caulked or fitted state. Consequently, the temporary fixing becomes more reliable so that the magnetic core portions are also satisfactorily prevented from being separated or "unfixed" in the subsequent manufacturing steps. Therefore, the ability to handle the magnetic core portion becomes easier or increases.

In the present invention, it is desirable that the temporary fixing portion forming step is carried out by bending a part of the magnetic core portion in the direction of the plate thickness to form the temporary fixing portion. According to the present invention, the temporary fixing portion is formed by bending so that the temporary fixing portion is easy to form. In this case, a part of the magnetic core portion is bent, thereby eliminating the necessity of steps for separately preparing a component for the temporary fixing portion and assembling components, and simplifying a working step of the magnetic core portion.

In the present invention, it is desirable that the temporary fixing portion forming step is carried out by forming two notches at a peripheral edge of the magnetic core portion and bending the magnetic core portion between the notches in the direction of the plate thickness to form the temporary fixing portion. According to the present invention, the temporary fixing portion forming step is carried out by forming the peripheral edge of the magnetic core portion with the notches and bending the magnetic core portion to form the temporary fixing portion. Thus, the temporary fixing portion is formed by a series of pressings. If the working steps are incorporated among the pressings in the magnetic core portion forming step, the temporary fixing portion is formed simply and efficiently. Further, the temporary fixing portion is constructed by the magnetic core portion between the two notches. If the magnetic core portions are laminated, therefore, the temporary fixing portion is fitted between notches in the magnetic core portion which is one layer above or below the magnetic core portion. Therefore, the temporary fixing is reliable.

In the present invention, it is desirable that the temporary fixing portion forming step is carried out by performing the bending until the distance from the end of the temporary fixing portion after the bending to the plane of the magnetic core portion is 1.5 to 10 times the plate thickness of the magnetic core portion. According to the present invention, the distance between the end of the temporary fixing portion and the plane of the magnetic core portion is suitably set. Therefore, the temporary fixing portion is satisfactorily fitted between the notches in the other laminated magnetic core portion, thereby making the temporary fixing more reliable. At this time, if the distance between the end of the temporary fixing portion and the plane of the magnetic core portion is made large, the temporary fixing portion is fitted in notches in the magnetic core portion which is a plurality of layers below or above the magnetic core portion, thereby allowing more stable temporary fixing.

In the present invention, it is desirable that the temporary fixing portion forming step is carried out by performing the bending until an angle between the plane direction of the temporary fixing portion after the bending and the plane direction of the magnetic core portion is 5° to 45°.

According to the present invention, the angle between the plane direction of the temporary fixing portion and the plane direction of the magnetic core portion is suitably set so that the temporary fixing portion is satisfactorily fitted between the notches in the other laminated magnetic core portion, thereby making the temporary fixing better and more reliable. At this time, if the angle between the plane direction of the temporary fixing portion and the plane of the magnetic core portion is made large, the temporary fixing portion is fitted between the notches in the magnetic core portion which is a plurality of layers below or above the magnetic core portion, thereby allowing a more stable temporary fixing.

In the present invention, it is desirable that the temporary fixing portion forming step is carried out by forming at least one set of temporary fixing portions, opposed to each other, at the peripheral edge of the magnetic core portion. According to the present invention, the temporary fixing portions are formed at opposite positions at the peripheral edge of the magnetic core portion. Therefore, the temporary fixing portions temporarily fix the other magnetic core portion at the opposite positions. Consequently, the whole of the magnetic core portion can be temporarily and stably fixed.

In the present invention, it is desirable that the temporary fixing portion forming step is carried out by performing the bending at the position where the magnetic flux density is lower than the magnetic flux density in a magnetic path formed in the magnetic core portion to form the temporary fixing portion. According to the present invention, in the magnetic core portion, the temporary fixing portion is formed in the portion where the magnetic flux density is lower than the magnetic flux density in a portion where the magnetic path is to be formed, thereby forming a good magnetic path without preventing the magnetic path from being formed in the magnetic core portion. If the magnetic core portion is employed for a generator, for example, therefore, necessary generation performance is ensured at a good space efficiency.

In the present invention, it is desirable that the temporary fixing portion forming step is carried out by forming the temporary fixing portion such that the width thereof along the peripheral edge of the magnetic core portion is 0.3 to 1.0 mm and the length thereof in a direction perpendicular to the width is 0.2 to 1.0 mm. According to the present invention, the dimensions of the temporary fixing portion are suitably set. Therefore, a fixing force of the temporary fixing portion is ensured within a range in which the performance of the magnetic core portion is not degraded. Since the peripheral edge of the magnetic core portion is formed with the notches to form the temporary fixing portion, the notches are not satisfactorily formed if the width is smaller than 0.3 mm or the length is smaller than 0.2 mm, thereby making it impossible for the temporary fixing portion to have a necessary fixing force.

In the present invention, it is desirable that the magnetic core manufacturing method includes a fastening step for setting the adhesives by heating the laminated magnetic core portions after the temporary fixing to fasten the adjacent magnetic core portions to each other. According to the present invention, the adhesives are heated in the fastening step to fasten the magnetic core portions to one another so that the magnetic core portions are simply fixed to one another. Conventionally in a method of winding the insulating film to fix temporarily the magnetic core portions and impregnating areas among the laminated magnetic core portions with the adhesives, the adhesives adhere to a coil core winding portion. This also causes the winding efficiency of the coil to be reduced. According to the present invention, the adhesives are previously interposed between the magnetic core portions. Therefore, the magnetic core portions are bonded to each other only by heating, thereby significantly simplifying the fastening step.

In the present invention, it is desirable that the fastening step includes a load applying procedure to apply a load in the direction in which the laminated magnetic core portions are brought nearer to one another to make the adjacent magnetic core portions adhere to each other. According to the present invention, when the adhesives are heated, the load applying procedure is carried out. Therefore, the magnetic core portions adhere to one another under a predetermined load, thereby improving fastening properties. Consequently, the magnetic core portions are stably fastened to one another without being stripped. Therefore, the performance of the magnetic core is stabilized.

In the present invention, it is desirable that the load applying procedure is carried out by applying the load to the magnetic core portion by a predetermined jig, and treating a release agent for at least one, of surfaces of the jig that is in contact with the magnetic core portion. According to the present invention, the release agent is treated for at least the surface, that in contact with the magnetic core portion of the surfaces of the jig for applying the load to the magnetic core portion. Even when the load is applied to the magnetic core portion so that the adhesives jut out of the peripheral edge of the magnetic core portion, the adhesives are therefore prevented from adhering to the jig. Thus, the durability of the jig as well as satisfactorily carrying out the fastening step of the magnetic core portions is improved.

In the present invention, it is desirable that the treatment of the release agent is completed using PTFE (Poly Tetra Fluoro Ethylene) to plate a surface. According to the present invention, at least the surface in contact with the magnetic core portion of the jig is plated with the release agent composed of PTFE. Therefore, it is more difficult for the adhesives which have jutted out of the peripheral edge of the magnetic core portion at the time of applying the load to adhere thereto. Further, PTFE has superior heat resistance. Even if PTFE were heated in the fastening step, degradation and stripping would be prevented, thereby satisfactorily carrying out the fastening step.

In the present invention, it is desirable that the adhesives are composed of heat-resistant resin. According to the present invention, the adhesives are composed of heat-resistant resin so that they are treated at a relatively high temperature in the fastening step. Consequently, the fastening step and an annealing step, described later, can be simultaneously carried out in one step, thereby simplifying the manufacturing steps as well as reducing the manufacturing cost. Since the adhesives are composed of heat-resistant resin, an improvement in the heat resistance of the magnetic core to be manufactured is also achieved as a whole.

In the present invention, it is desirable that the magnetic core manufacturing method includes an annealing step for annealing the magnetic core portions within the same oxygen-free furnace together with the fastening step. According to the present invention, degradation in magnetic properties due to strain induced by the pressing is recovered by the annealing step. At this time, the annealing step is carried out simultaneously with the fastening step, thereby further promoting simplification and an increase in the efficiency of the manufacturing steps.

In the present invention, it is desirable that the fastening step and the annealing step are carried out under conditions of a fastening and annealing temperature of 200° C. to 500° C. According to the present invention, the fastening and annealing temperature is suitably set, fastening and annealing can be performed at the same time and at the same temperature, thereby simultaneously obtaining good adhesive properties and good magnetic properties.

In the present invention, it is desirable that the annealing step is carried out with the magnetic core portion arranged within the oxygen-free furnace. According to the present invention, the annealing is performed within the oxygen-free furnace. Therefore, the annealing is satisfactorily performed, thereby ensuring the magnetic properties of the magnetic core.

In the present invention, it is desirable that the magnetic core manufacturing method includes an annealing step for annealing the magnetic core portion before the magnetic core portion forming step. According to the present invention, the magnetic core portions are annealed before the magnetic core portion forming step, that is, before the plurality of base materials are laminated. Thus, the annealing is reliably performed, so that the magnetic properties of each of the magnetic core portions are satisfactorily ensured. This is particularly useful because the fastening step and the annealing step can be respectively and separately carried out while ensuring the magnetic properties of each of the magnetic cores by carrying out the annealing step before the magnetic core portion forming step even when thermosetting resin is used as the adhesives, for example. In the present invention, it is desirable that the magnetic core manufacturing method further includes a fastening step for setting the adhesives by heating the laminated magnetic core portions after the temporary fixing to fasten the adjacent magnetic core portions to each other. The fastening step includes a temporary fixing portion correcting procedure to bend the temporary fixing portion formed by the bending again so that the plane direction thereof coincides with the plane direction of the magnetic core portion. According to the present invention, the temporary fixing portion correcting procedure is simultaneously carried out in the fastening step, and the bending of the temporary fixing portion is corrected so that the plane direction thereof coincides with the plane direction of the magnetic core portion. After the magnetic core portions are fastened to one another, the bending is performed again such that the unnecessary temporary fixing portion is arranged within the plane of the magnetic core portion. Therefore, the temporary fixing portion does not project from the plane of the magnetic core after the fastening, thereby improving the space efficiency in the thickness direction.

A magnetic core according to the present invention is characterized by being manufactured by the above-mentioned magnetic core manufacturing method.

According to the present invention, the magnetic core is manufactured by the above-mentioned magnetic core manufacturing method. Therefore, the same effect as that in the above-mentioned magnetic core manufacturing method is obtained; the magnetic core is manufactured at low cost by the simple manufacturing method, and the manufacturing efficiency thereof becomes better.

In the present invention, it is desirable that a hole or notch for fixing the magnetic core is formed. According to the present invention, the magnetic core is previously formed with the fixing hole or notch. Therefore, the magnetic core is easily fixed to a predetermined position of an electronic device to which the magnetic core is attached.

An electromagnetic transducer according to the present invention is characterized by including a rotor that has a permanent magnet. The aforementioned magnetic core is arranged in the vicinity of the rotor to cause a magnetic flux to flow, and a coil arranged in the vicinity of the magnetic core. According to the present invention, the electromagnetic transducer includes the above-mentioned magnetic core. Therefore, the same effect as the above-mentioned effect of the magnetic core is obtained; the magnetic core is manufactured at a low cost by the simple manufacturing method, and the manufacturing efficiency thereof becomes better, so that the manufacturing cost of the electromagnetic transducer is also reduced.

In the present invention, it is desirable that the electromagnetic transducer further includes a coil conducting substrate to connect a coil to an external circuit. The substrate is arranged on a surface coated with the adhesives of the magnetic core portion. According to the present invention, the coil conducting substrate is arranged on the surface coated with the adhesives of the magnetic core portion. Therefore, the substrate can be simultaneously bonded with the adhesives, thereby promoting a reduction in the manufacturing cost of the electromagnetic transducer by further simplifying the manufacturing steps.

An electromagnetic transducer according to the present invention is characterized by including a coil frame composed of an insulating material and having a recess in a concave shape in cross section, at least a part of which is opened, formed therein. The above-mentioned magnetic core can be accommodated in the recess. Further, the electromagnetic transducer has a coil wound around the outer periphery of the coil frame. According to the present invention, the core composed of an amorphous metal is accommodated in the recess in the coil frame, and the coil is wound around the outer periphery of the coil frame. Therefore, the coil is not brought into contact with a sharp outer edge of the amorphous metal. Consequently, a fracture in the coil by an outer edge of the core composed of the amorphous metal can be reliably prevented. In this case, the coil is wound around the outer periphery of the coil frame, thereby eliminating the necessity of a conventional insulating film and the necessity of winding work of the insulating film. Therefore, the necessity of adjustment and management of a winding force is eliminated, thereby simplifying the manufacturing steps of the electromagnetic transducer as well as improving the yield thereof. Since the recess is formed in a concave shape in cross section, at least a part of which is opened, the core can be easily accommodated from an opening of the recess, thereby simplifying the manufacturing work of the electromagnetic transducer.

Conventionally in an electromagnetic transducer used for a radio wave receiving antenna, a stepping motor and the like of a radio controlled timepiece which receives standard radio waves on which time information is superimposed to correct display time, and an insulating film is wound around amorphous metal laminate, for example, to coat an amorphous metal laminate and wind the coil around the insulating film (see Japanese Unexamined Patent Application No. 2003-110341). Although an outer edge of the amorphous metal foil is generally sharp by a warp or a burr occurring at the time of blanking, a portion around which the coil is wound is coated with an insulating film. Therefore, an outer edge of the amorphous metal foil is not directly brought into contact with the coil, thereby preventing the coil from being fractured or short-circuited by the amorphous metal foil.

However, the electromagnetic transducer having such a configuration has the effect of slightly preventing the coil from being fractured by the coating with the insulating film. However, the insulating film itself has a film shape and is a soft material. Therefore, it is considered that the sharp outer edge of the amorphous metal foil fractures the insulating film depending on the winding force of the insulating film. Consequently, the protection of the coil is insufficient when only the coating with the insulating film is used. The coil cannot be reliably prevented from being fractured. In the winding work of the insulating film, the winding force must be adjusted and managed thus, the winding work becomes complicated, and a stable winding force is difficult to obtain. Therefore, the yield of the electromagnetic transducer cannot be improved. On the other hand, in the electromagnetic transducer according to the present invention, the insulating film, which was conventionally required, can be omitted, so that the manufacture thereof is simplified, thereby reliably preventing the coil from being disconnected.

In the present invention, it is desirable that the recess is formed in a shape that substantially resembles a box without the left hand side vertical line segment, the character ko from the Japanese katakana syllabary. According to the present invention, the recess in the coil frame is formed in a substantially katakana ko shape, so that the formation of the recess becomes easy. Further, the recess is formed in a substantially katakana ko shape so that the opening of the recess can be made large. Therefore, the magnetic core is easily accommodated in the recess so that the manufacturing steps are simplified.

In the present invention, it is desirable that a circuit board on which the electric element is mounted is fixed to the coil frame. According to the present invention, the circuit board is fixed to the coil frame. Therefore, a space on the coil frame is effectively utilized, thereby improving the space efficiency. When the electromagnetic transducer is applied to the radio receiving antenna of the timepiece, for example, the coil frame and the circuit board must be accommodated in a small space of the timepiece. In such a case, however, the circuit board is fixed to the coil frame, and the electric element is mounted on the circuit board so that the space efficiency is improved. Therefore, the miniaturization of the timepiece is promoted.

When the electromagnetic transducer is applied to a radio wave receiving antenna, for example, the circuit board on which the electric element is mounted is fixed on the coil frame. Therefore, the magnetic core can be also arranged in a space corresponding to the circuit board. Generally in the antenna, the longer the magnetic core is the better the receiving sensitivity of radio waves becomes. Therefore, the performance of the electromagnetic transducer can be improved without increasing the size of the timepiece.

In the present invention, it is desirable that flanges projecting from the coil frame are formed at positions of the coil frame corresponding to both ends of the coil. According to the present invention, the coil frame is formed with the flanges. When the coil is wound around the coil frame between the flanges, therefore, the flanges perform the function of preventing the coil from being unwound. Consequently, the winding work becomes simple and reliable. Since a coil having a predetermined winding number is simply wound around the coil frame, a predetermined coil length is ensured, thereby stabilizing the performance of the electromagnetic transducer.

In the present invention, it is desirable that the coil frame is formed with a plurality of fixing holes to screw the electromagnetic transducer. According to the present invention, the coil frame is provided with the fixing holes. Therefore, the electromagnetic transducer can be screwed without being brought into contact with the magnetic core composed of the amorphous metal so that the fixing of the electromagnetic transducer becomes reliable. That is, in the configuration of a conventional electromagnetic transducer having no coil frame, the magnetic core cannot be directly screwed. Therefore, a method of interposing the magnetic core from both sides by other members and screwing the other members has been employed. In such a conventional method, however, other members are required for fixing. Therefore, the number of components is increased, and the configuration becomes complicated. Further, the magnetic core is only interposed so that the fixing of the electromagnetic transducer is unreliable. On the other hand, according to the present invention, such a problem is solved so that the fixing of the electromagnetic transducer is reliable, and the electromagnetic transducer is resistant to vibration and shock.

A timepiece according to the present invention is characterized by including the above-mentioned electromagnetic transducer, the electromagnetic transducer being arranged within a movement-holder in the timepiece, and at least a part of the coil frame being formed along an outer shape of the movement-holder. According to the present invention, the timepiece includes the above-mentioned electromagnetic transducer. Therefore, the same effect as the above-mentioned effect of the electromagnetic transducer is obtained. The timepiece can be manufactured by simple manufacturing steps, thereby reliably preventing the coil from being fractured. Furthermore, at least a part of the coil frame is formed along the outer shape of the movement-holder. Therefore, the electromagnetic transducer can be arranged along the outer shape of the movement-holder, thereby improving the space efficiency in the movement-holder. Consequently, the miniaturization of the timepiece is promoted. Conversely, the magnetic core composed of the amorphous metal can be formed to be longer in the same overall space. Therefore, the performance of the electromagnetic transducer is improved without increasing the size of the timepiece.

In the present invention, it is desirable that the electromagnetic transducer is a radio wave receiving antenna that is configured to receive standard radio waves on which time information is superimposed. According to the present invention, the electromagnetic transducer is the radio wave receiving antenna. Therefore, the electromagnetic transducer is arranged along the outer shape of the movement-holder so that the magnetic core becomes longer, thereby improving the receiving sensitivity. Consequently, the miniaturization of the timepiece is promoted while ensuring the good receiving sensitivity.

An electronic device according to the present invention is characterized by including the above-mentioned electromagnetic transducer. According to the present invention, the electronic device includes the electromagnetic transducer so that the same effect as the effect of the electromagnetic transducer is obtained. Therefore, the magnetic core is manufactured at a low cost by the simple manufacturing method, and the manufacturing efficiency becomes better so that the manufacturing cost of the electronic device is also reduced. Here, examples of the electronic device also include a timepiece. The electronic device is easy to handle and particularly useful in a case in which the device is the timepiece because each of components particularly in a portable timepiece or the like is miniaturized so that magnetic core portions can be temporarily fixed to one another by the simple manufacturing steps.

EFFECT OF THE INVENTION

According to a magnetic core manufacturing method, a magnetic core, an electromagnetic transducer having the magnetic core, a timepiece having the electromagnetic transducer, and an electronic device having the electromagnetic transducer in the present invention, laminated magnetic core portions are temporarily fixed to one another by temporary fixing portions in magnetic core portions. Therefore, the temporary fixing becomes simple and reliable, thereby making it possible to make the manufacturing steps more efficient.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIGS. 2(A) and 2(B) are views of a diagram showing stator material of the timepiece according to the present embodiment;

DETAILED DESCRIPTION OF THE PREFERRED EMBODIMENTS

Figure 1:
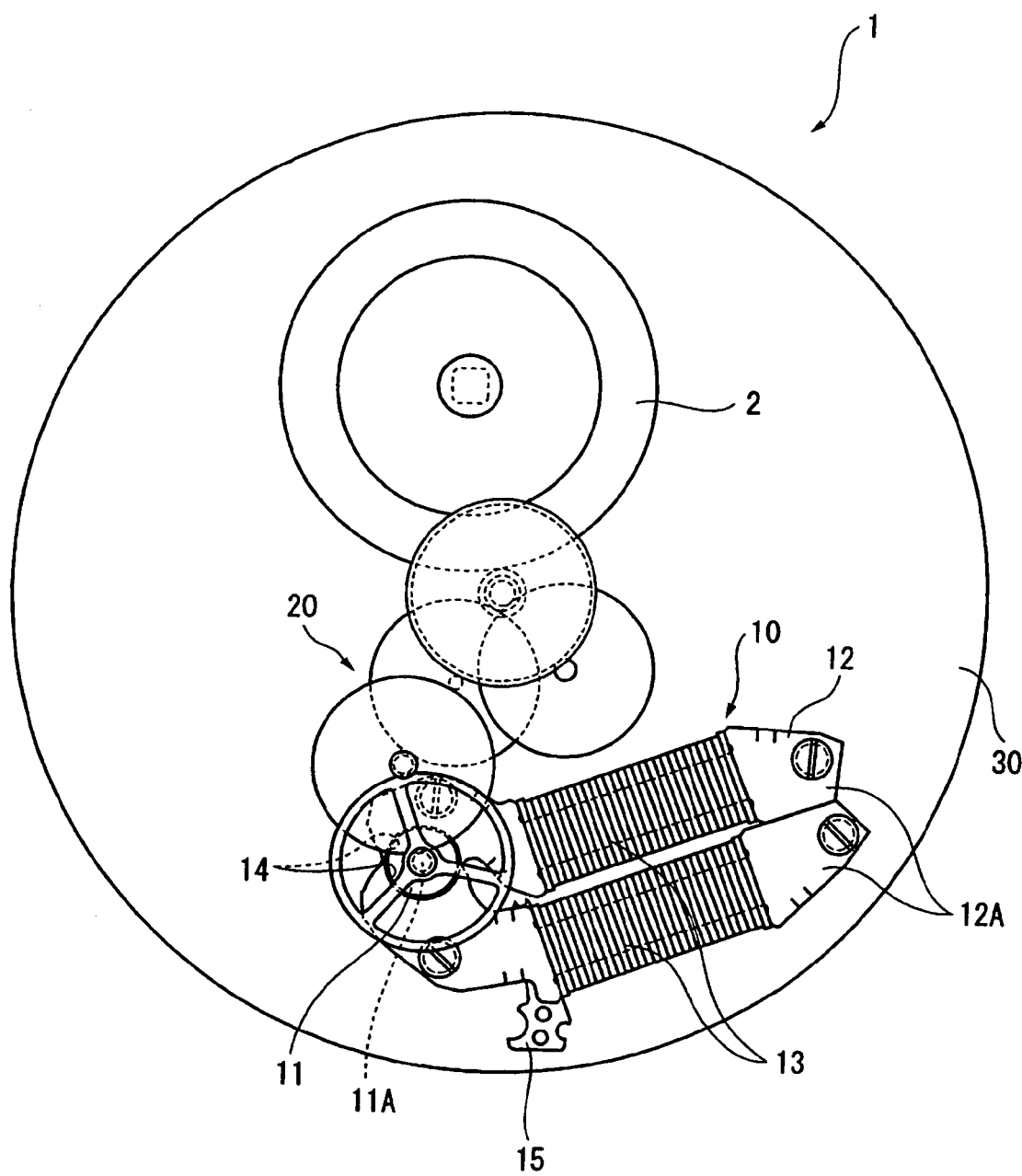
FIG. 1 is a schematic view of a timepiece according to a preferred embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Embodiments of the present invention will be described on the basis of the drawings. In the second and subsequent embodiments, described later, the same components as components in the first embodiment, described below, and components having the same functions as those in the first embodiment are assigned the same reference numerals and hence, the description thereof is simplified or is not repeated.

First Embodiment

FIG. 1 is a schematic view of a timepiece 1 serving as an electronic device according to an embodiment of the present invention. In FIG. 1, the timepiece 1 has a barrel 2. The barrel accommodates a motor mainspring. The motor mainspring drives a gear-train 20 by mechanical energy generated from the motor mainspring, and generates power by a generator 10 serving as an electromagnetic transducer which rotates upon receipt of rotation from the gear-train 20. An electronic circuit (not shown) controls the rotation period of the generator 10 by the power obtained by the generator 10 to govern the speed of the gear-train 20.

The generator 10 includes a rotor 11, a stator 12, and a pair of coils 13. The rotor 11 is meshed with the gear-train 20 and rotated. The stator 12 is provided to form a magnetic circuit to interlink the magnetic flux of a permanent magnet 11A attached to the rotor 11. The pair of coils 13 are respectively wound around stator materials 12A. The pair of coils 13 serves as a pair of magnetic cores constituting the stator 12 and converts a magnetic flux change at the stator materials 12A due to the rotation of the permanent magnet 11A into electric power. A circuit block (not shown) having an electronic circuit for hand driving control including a quartz, tuning-fork oscillator, and an IC is electrically connected to the coils 13 through a coil conducting substrate 15. The electronic circuit is driven by the power generated by the generator 10, and the rotor 11 is braked to govern the speed of the gear-train 20, to carry out hand driving control.

The pair of stator materials 12A is provided adjacent to each other, and is fixed to a bottom plate 30. Substantially semicircular notches 14 are formed on the opposite sides of the stator materials 12A, and the rotor 11 is held in a substantially circular space enclosed by the notches 14. The coil 13 is wound around a part of the stator material 12A so that the part is a magnetic core.

FIG. 2(A) is a plan view of one stator material 12A, and FIG. 2(B) is a side view thereof. As shown in FIGS. 2(A) and 2(B) and FIG. 1, described above, the stator material 12A is formed of a laminate of a plurality of magnetic core portions 16 composed of a thin plate of an amorphous magnetic substance, and the magnetic core portions 16 are fastened to one another with adhesives. Fixing holes 17 to fix the stator material 12A to the base plate 30 are respectively formed at both ends of the stator material 12A. Examples of the amorphous magnetic substance include 66Co-4Fe-1Ni-14B-15Si (a numeral indicates the weight percentage of each of compositions) as a cobalt-based amorphous metal (including not less than 50% by weight of Co) and 8Fe-13B-9Si (a numeral indicates the weight percentage of each of compositions) as an iron-based amorphous metal (including not less than 50% by weight of Fe).

A method of manufacturing the stator material 12A will be described below.

Figure 3:
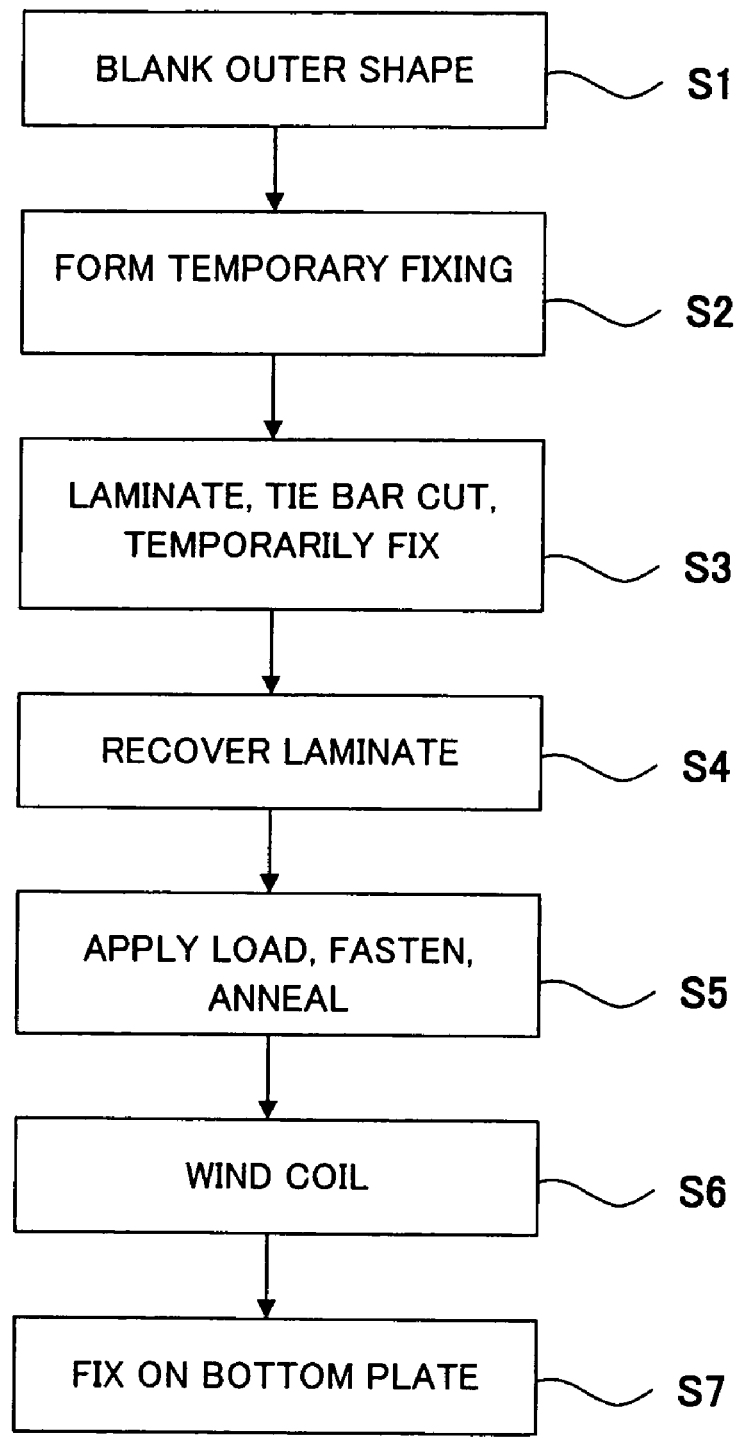
FIG. 3 is a view of a flow chart showing the steps of manufacturing the stator material.

FIG. 3 is a flow chart showing the method of manufacturing the stator material 12A. FIGS. 4 to 10 illustrate the steps of manufacturing the stator material 12A.

Figure 4:
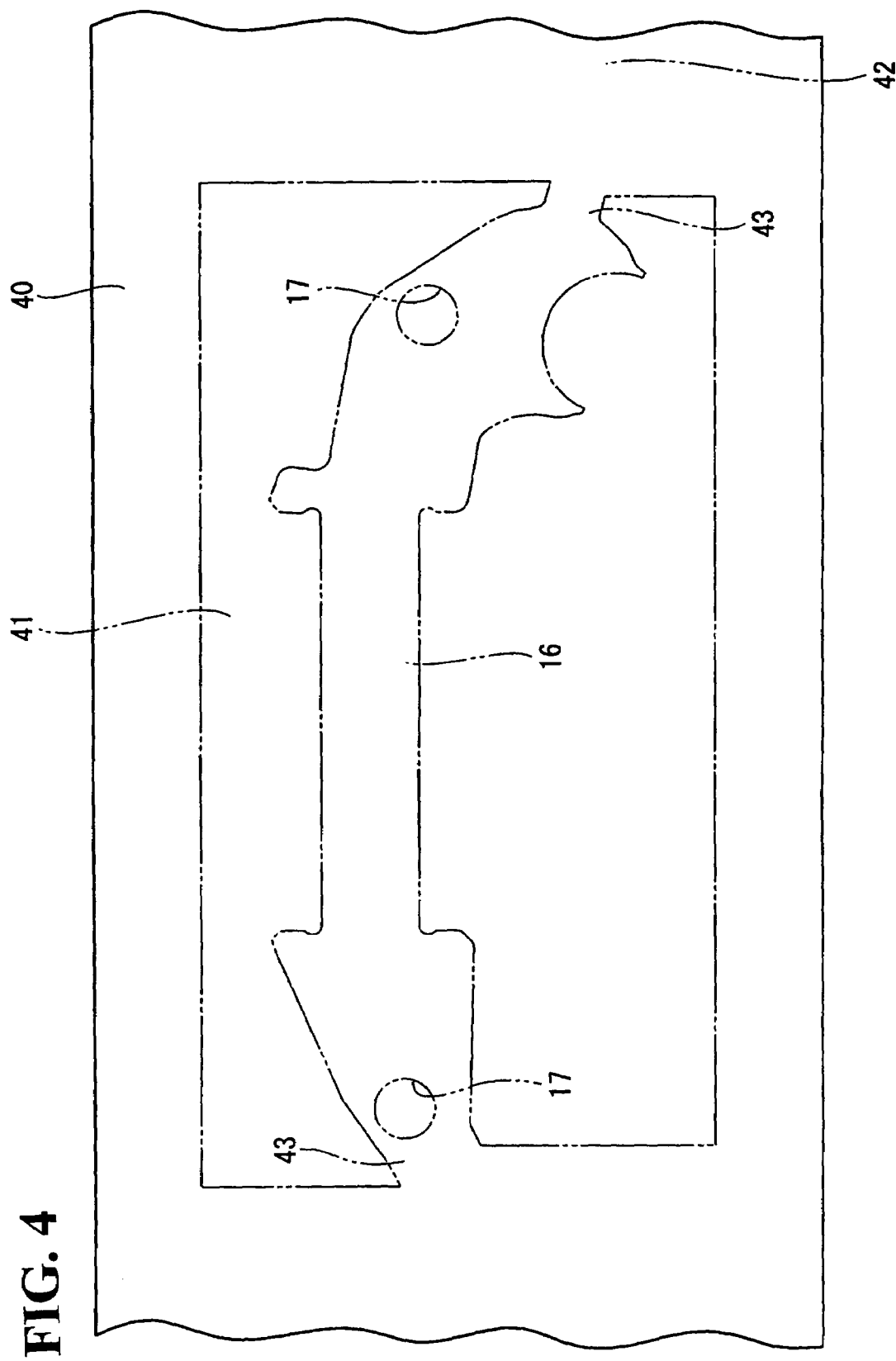
FIG. 4 is a view of a diagram showing a magnetic core portion forming step of the stator material.

Further, in the steps S1 to S3 shown in FIG. 3, a magnetic core portion forming step for forming the shape of the magnetic core portion 16 from a base material 40 (see FIG. 4) is carried out. The base material 40 is a thin plate of an amorphous magnetic substance and preferably has a thickness of approximately 10 µm to 50 µm (approximately 23 µm in the present embodiment), for example. The base material is supplied in a suitable supply form such as in a sheet form or a roll form. The base material 40 is previously subjected to a coating step for coating one of its surfaces with heat-resistant resin (polyimide resin) serving as adhesives, so that an adhesive layer 50 (see FIG. 5(B) is formed on a surface of the base material 40. The thickness of the adhesive layer 50 is approximately 5 µm in the present embodiment. The thickness of the adhesive layer 50 is preferably 1 to 15 µm (not less than 1 µm nor more than 15 µm) and more preferably 2 µm to 8 µm (not less than 2 µm nor more than 8 µm). Within the preferred range of the thickness, required adhesion of the magnetic core portion 16 by the adhesive layer 50 is ensured and at the same time, magnetic properties of the magnetic core portion 16 are not degraded. The coating step is carried out for one surface having the finer surface accuracy of the base material 40, thereby forming the adhesive layer 50 to a more uniform thickness. In the present embodiment, a glossy surface (a mirror surface: the maximum surface accuracy is not more than 0.8 μm) of the base material 40 is subjected to the coating step. After the coating step, the surface roughness Ry of the surface on which the adhesive layer 50 is formed is approximately 1.5 to 1.7 μm. When the adhesive layer 50 is formed on a coarse surface (a pearskin-finished surface: the maximum surface accuracy is not more than 1.6 μm) on the opposite side of the glossy surface, for example, the surface roughness Ry of the surface is approximately 2.1 to 2.3 μm. As can be seen from the foregoing, the adhesive layer 50 having a more uniform thickness is formed by coating the surface having the finer surface accuracy with the adhesives. Examples of a method for coating with adhesives include a spray method, a roll coating method, a printing method, and a spin coating method.

The magnetic core portion forming step is carried out by pressing. First, as shown in FIG. 4, in the step S1, a blanking portion 41 along the shape of the magnetic core portion 16 is blanked from the base material 40 to form the magnetic core portion 16. The residual base material portion 42 remains without being blanked around the magnetic core portion 16. The connecting portion 43 connects the magnetic core portion 16 and the residual base material portion 42 to each other.

Figure 5A:
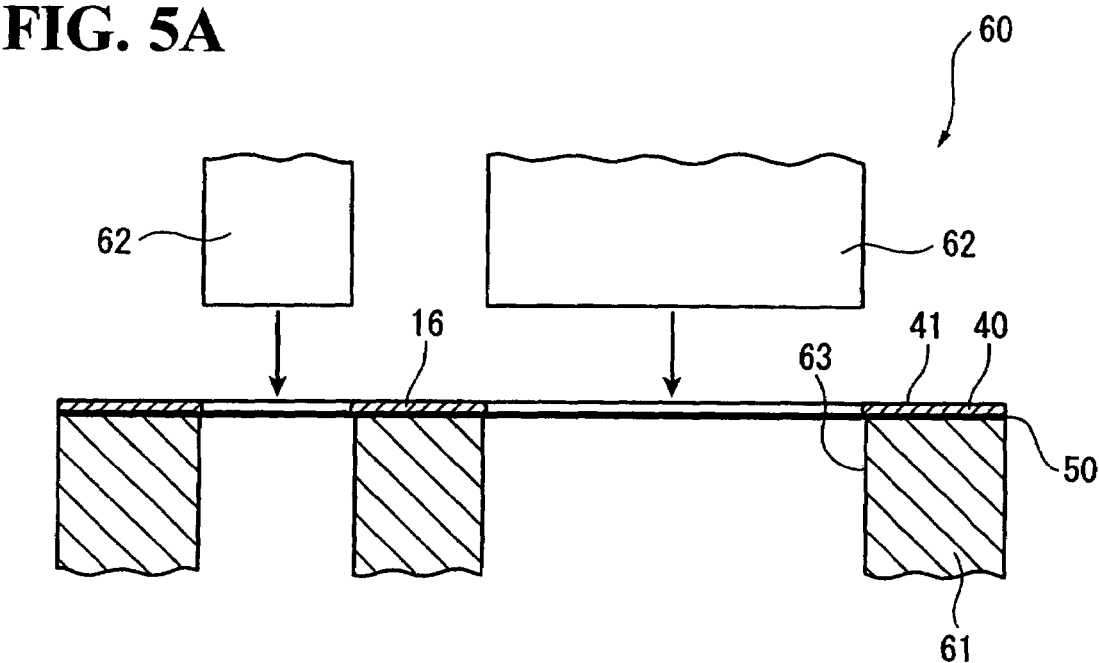
FIGS. 5A and 5B are views of diagrams further showing the magnetic core portion forming step of the stator material.
Figure 5B:
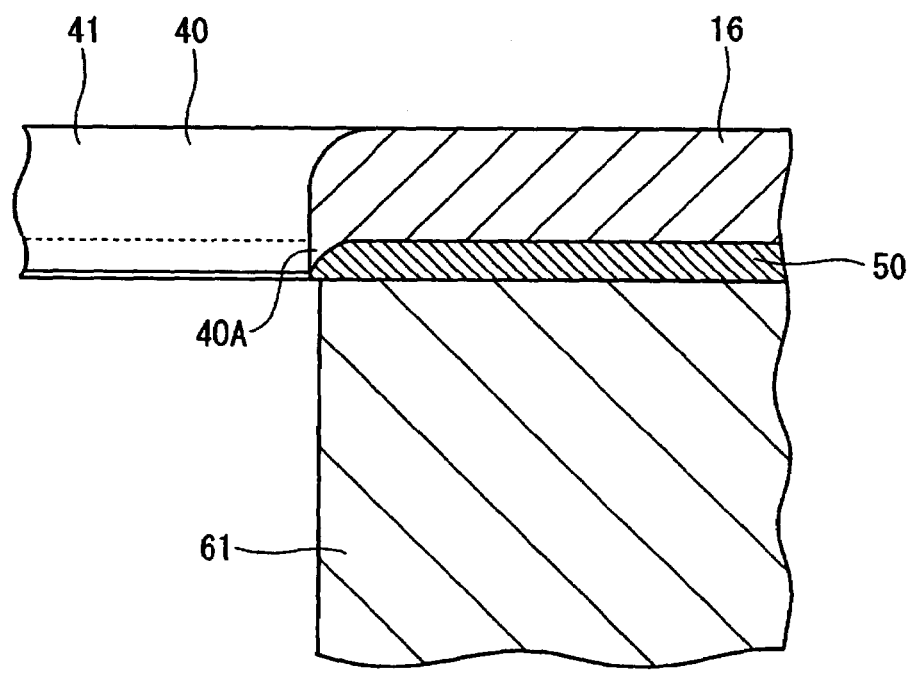

FIGS. 5(A) and 5(B) are diagrams showing the pressing in the magnetic core portion forming step. As shown in FIG. 5(A), the pressing is performed by a pressing machine 60 having a die (a female die) 61 and a punch (a male die) 62. The die 61 is formed with a blanking hole 63 in the shape of the blanking portion 41. The shape of the punch 62 is a shape corresponding to the blanking portion 41. The base material 40 is placed on the die 61 in the pressing machine 60. At this time, the base material 40 is arranged such that the adhesive layer 50 is opposed to the die 61. In this state, when the base material 40 is punched by the punch 62, the blanking portion 41 is blanked to form the magnetic core portion 16, the residual base material portion 42, and the connecting portion 43. A burr 40A of the base material 40 made by the pressing is formed on the side of the adhesive layer 50, as illustrated in an enlarged sectional view of the base material 40 shown in FIG. 5(B).

Figure 6:
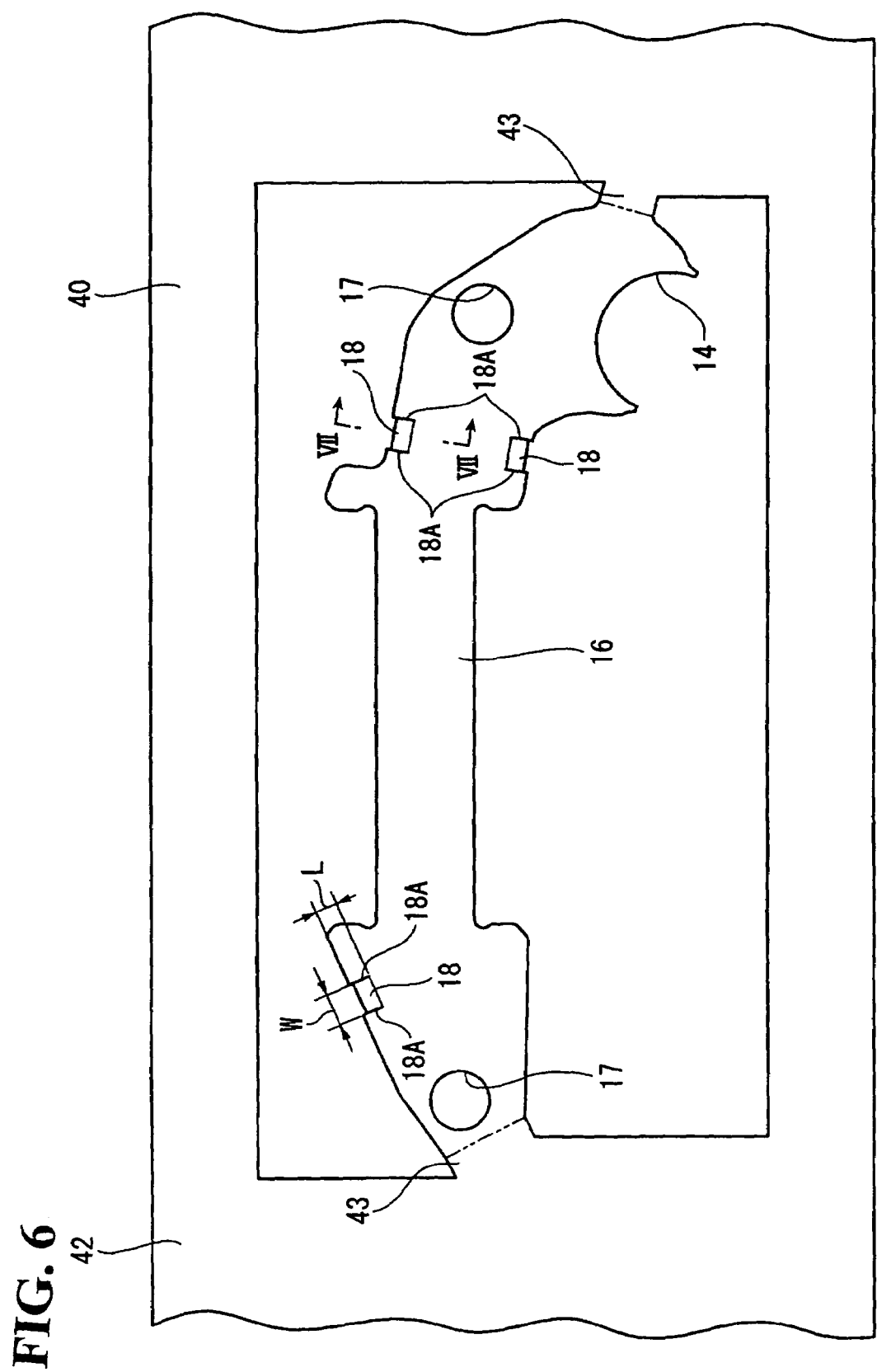
FIG. 6 is a view of a diagram showing a temporary fixing portion forming step of a magnetic core portion of the stator material.

In the step S2 shown in FIG. 3, when the plurality of magnetic core portions 16 are laminated, a temporary fixing portion forming step for forming temporary fixing portions 18 to fix temporarily the magnetic core portion 16 to each other is carried out. Referring now to FIG. 6, in the temporary fixing portion forming step, the temporary fixing portions 18 are formed at a plurality of positions (three positions in the present embodiment) at a peripheral edge of the magnetic core portion 16. The temporary fixing portion 18 is formed of a part of the magnetic core portion 16 between two notches 18A, which are parallel to each other, formed at the peripheral edge of the magnetic core portion 16. At least two of the temporary fixing portions 18 are arranged at opposite positions of the peripheral edge of the magnetic core portion 16. In the present embodiment, two of the three temporary fixing portions 18 are arranged opposite to each other on both sides of a magnetic path formed in the magnetic core portion 16. One of the three temporary fixing portions 18 is formed at the peripheral edge of the magnetic core portion 16 on the same side as the other one temporary fixing portion 18 with respect to the magnetic path formed in the magnetic core portion 16 and the temporary fixing portions 18 are arranged with a predetermined distance maintained therebetween at both ends in a direction along the magnetic path in the magnetic core portion 16. Here, all the temporary fixing portions 18 are arranged at the peripheral edge of the magnetic core portion 16, so that they are formed at positions where the magnetic flux density is lower than the magnetic flux density in the magnetic path.

In the temporary fixing forming step, the notches 18A are formed by the pressing machine 60 and simultaneously the temporary fixing portion 18 formed between the notches 18A is bent in the direction of the plate thickness of the base material 40.

Figure 7:
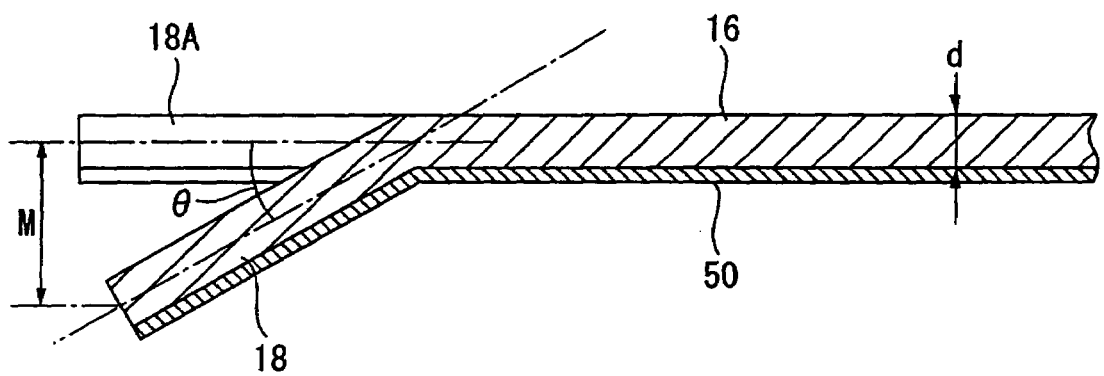
FIG. 7 is a side sectional view of a temporary fixing portion of the magnetic core portion.

FIG. 7 illustrates a cross-sectional view taken along a line VII-VII shown in FIG. 6. As illustrated in the partially enlarged sectional view of FIG. 7, the temporary fixing portion 18 is bent through a predetermined angle θ to a plane of the magnetic core portion 16 in the temporary fixing portion forming step.

Here, it is desirable that the dimensions of the temporary fixing portion 18 have a width W in a direction along the peripheral edge of the magnetic core portion 16 be 0.3 mm to 1.0 mm (not less than 0.3 mm nor more than 1.0 mm), and the length L perpendicular to the width W, that is, the length L in a direction along the notch 18A be 0.2 mm to 1.0 mm (not less than 0.2 mm nor more than 1.0 mm). Within this range, even if the base material 40 is a thin plate, the temporary fixing portion 18 can be satisfactorily formed without being deformed. In addition thereto, a temporary fixing force required for the temporary fixing portion 18 can be ensured, and the bending of the temporary fixing portion 18 also becomes easy and reliable. Further, it is desirable that the predetermined angle θ to the plane of the magnetic core portion 16 after the bending of the temporary fixing portion 18 is set in a range of 5° to 45° (not less than 5° nor more than 45°). Within this range, when the magnetic core portions 16 are laminated, the magnetic core portion 16 which is one layer or a plurality of layers below the magnetic core portion 16 having the temporary fixing portion 18 formed therein can be temporarily and satisfactorily fixed by the temporary fixing portion 18. Further, it is desirable that the distance M from a front end of the temporary fixing portion 18 after the bending thereof to the plane of the magnetic core portion 16 is set within a range which is 1.5 times to 10 times (not less than 1.5 times nor more than 10 times) the plate thickness d of the magnetic core portion 16. Within this range, the front end of the temporary fixing portion 18 reaches a position of the plane of the magnetic core portion 16 which is one or plurality of layers below the magnetic core portion 16 having the temporary fixing portion 18 formed therein so that the magnetic core portion 16 can be temporarily and reliably fixed.

By suitably setting the width W, the length L, the predetermined angle θ, the distance M, and so on, the number of layers that exist from the magnetic core portion 16 having the temporary fixing portion 18 formed therein to the magnetic core portion 16 which can be temporarily fixed by the temporary fixing portion 18 can be determined. When the width W of the temporary fixing portion 18 is smaller than 0.3 mm, the distance between the two notches 18A is reduced so that the notch 18A cannot be satisfactorily formed by pressing. Since the width W is reduced, sufficient strength in the case of bending cannot be ensured, and a required temporary fixing force of the temporary fixing portion 18 cannot be ensured. On the other hand, when the width W of the temporary fixing portion 18 is larger than 1.0 mm, a pressing force required for the bending of the temporary fixing portion 18 is increased resulting in degraded workability. As to the length L of the temporary fixing portion 18, when the length L is smaller than 0.2 mm, it is difficult to form the notch 18A, and a temporary fixing force of the temporary fixing portion 18 cannot be ensured, similar to the width W. When the length L is larger than 1.0 mm, the temporary fixing force at the front end of the temporary fixing portion 18 is weakened so that the temporary fixing force required as a whole cannot be ensured. When the length L is larger than 1.0 mm, a base end of the temporary fixing portion 18 may, in some cases, be arranged in a portion where the magnetic path in the magnetic core portion 16 is formed, thereby preventing the magnetic path from being satisfactorily formed.

When the predetermined angle θ is smaller than 50, the temporary fixing portion 18 in the magnetic core portion 16 cannot be satisfactorily engaged with the magnetic core portion 16 in the adjacent layer so that a required temporary fixing force cannot be ensured. On the other hand, when the predetermined angle θ is larger than 45°, a bending angle at the base end of the temporary fixing portion 18 is increased so that the strength at the base end is reduced. Particular in a case where a temporary fixing and correcting procedure, described later, to bend the temporary fixing portion 18 again so that the plane of the temporary fixing portion 18 coincides with the plane of the magnetic core portion 16 is carried out after the temporary fixing, when the bending angle is large, the base end of the temporary fixing portion 18 may, in some cases, be folded. In a case in which the distance M is smaller than 1.5 times the plate thickness d, a required temporary fixing force cannot be ensured similar to the predetermined angle θ. On the other hand, in a case in which the distance M is larger than 10 times the plate thickness d, the bending angle is increased, so that the strength at the base end of the temporary fixing portion 18 is reduced.

Figure 8:
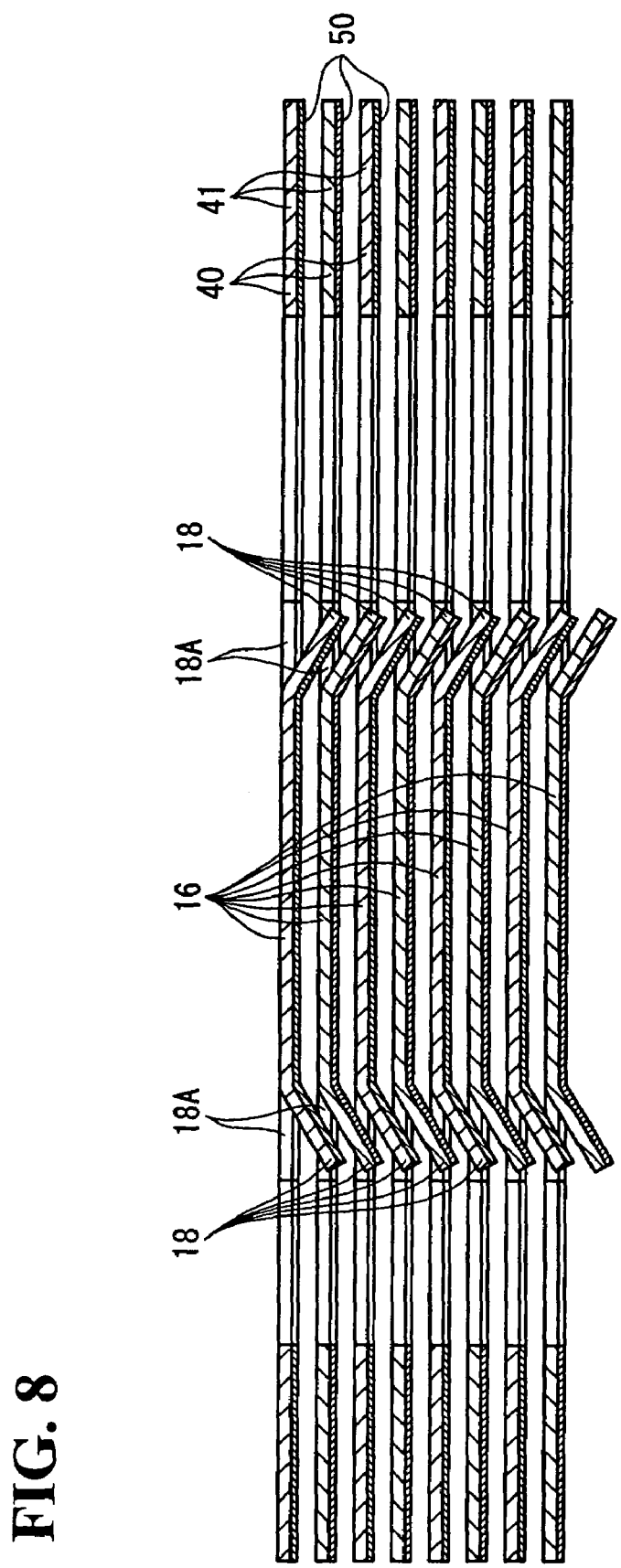
FIG. 8 is a view of a diagram showing a laminating step of the magnetic core portion.

After the temporary fixing portion 18 is formed, a laminating step for laminating the plurality of magnetic core portions 16, together with the base materials 40 and a cutting step are carried out in the same step S3 shown in FIG. 3. First, as illustrated in a cross-sectional view of FIG. 8 in the laminating step, the magnetic core portions 16 are laminated such that the positions thereof coincide with one another. In the present embodiment, 18 magnetic core portions 16 (only seven magnetic core portions 16 are illustrated in FIG. 8) are laminated. In this case, the temporary fixing portion 18 is inclined from the plane of the magnetic core portion 16. Therefore, a front end of each of the temporary fixing portions 18 is arranged in a part of each temporary fixing portion 18 in the magnetic core portion 16 which is one layer (adjacent layer) or a plurality of layers below the magnetic core portion 16 having the temporary fixing portion 16 formed therein. The adhesive layer 50 is provided on one surface of the magnetic core portion 16. By laminating the magnetic core portions 16, therefore, the adhesive layer 50 is interposed between the magnetic core portions 16.

Figure 9:
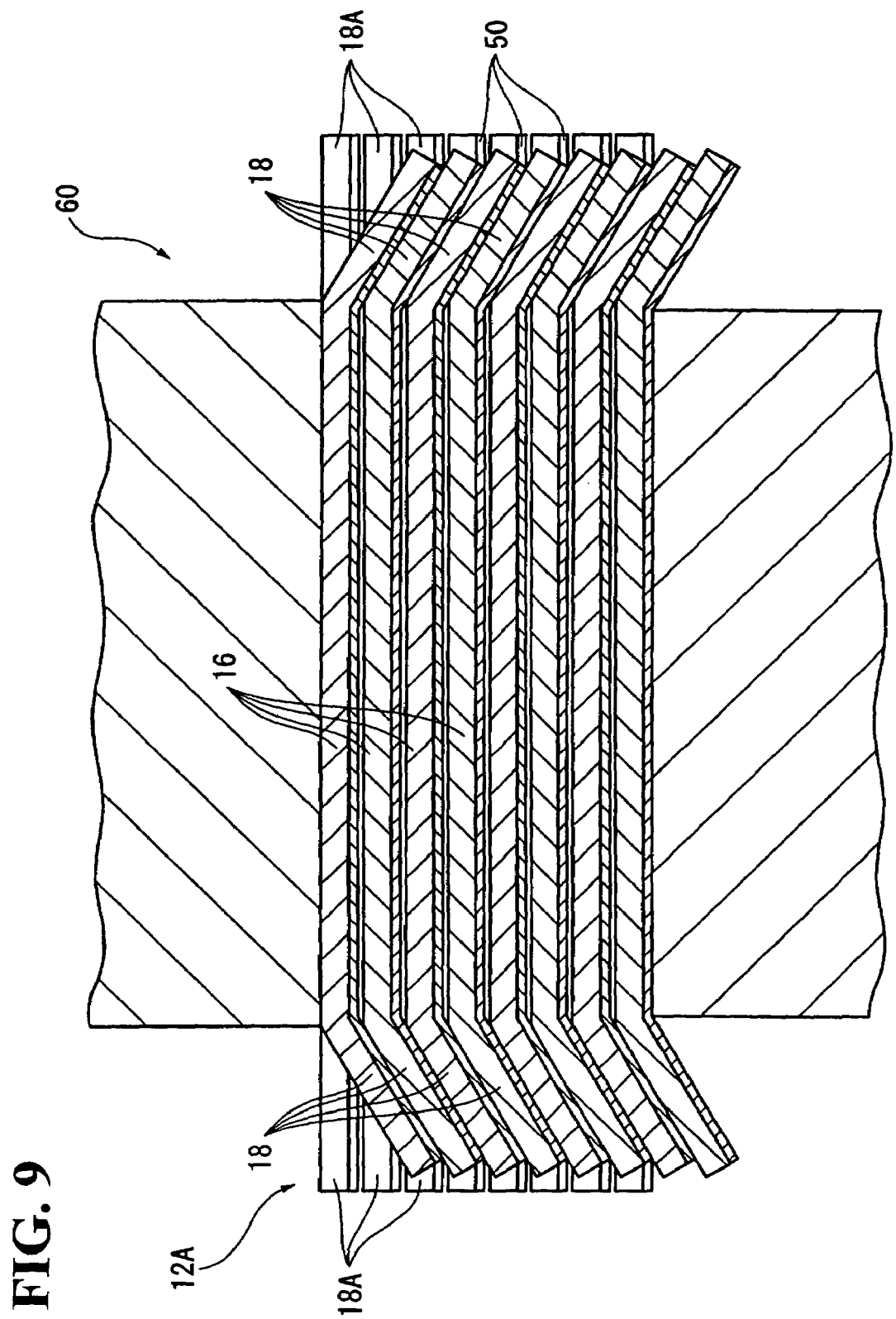
FIG. 9 is a view of a diagram showing a cutting step of the magnetic core portion.

In the cutting step, the laminated magnetic core portions 16 are temporarily fixed to one another, the residual base material portions 42 and the connecting portion (tie bar) 43 are cut from the magnetic core portion 16. First, the laminated magnetic core portions 16 are pressed in directions nearer to one another by the pressing machine 60. Consequently, the temporary fixing portion 18 in the magnetic core portion 16 is fitted between the notches 18A in the other laminated magnetic core portion 16 so that the magnetic core portions 16 are temporarily fixed to each other (a temporarily fixing step), as shown in FIG. 9. When the connecting portion 43 is cut from the magnetic core portion 16 to cut off the magnetic core portion 16, the laminated magnetic core portions 16 are taken out as a stator material 12A in a state of a temporarily fixed laminate, and are recovered (step S4 in FIG. 3).

In the step S5 shown in FIG. 3, a fastening step for heating the adhesive layer 50 interposed between the magnetic core portions 16 in the stator material 12A to fasten the magnetic core portions 16, and an annealing step for annealing the magnetic core portions 16 simultaneously with the fastening step are carried out.

Figure 10:
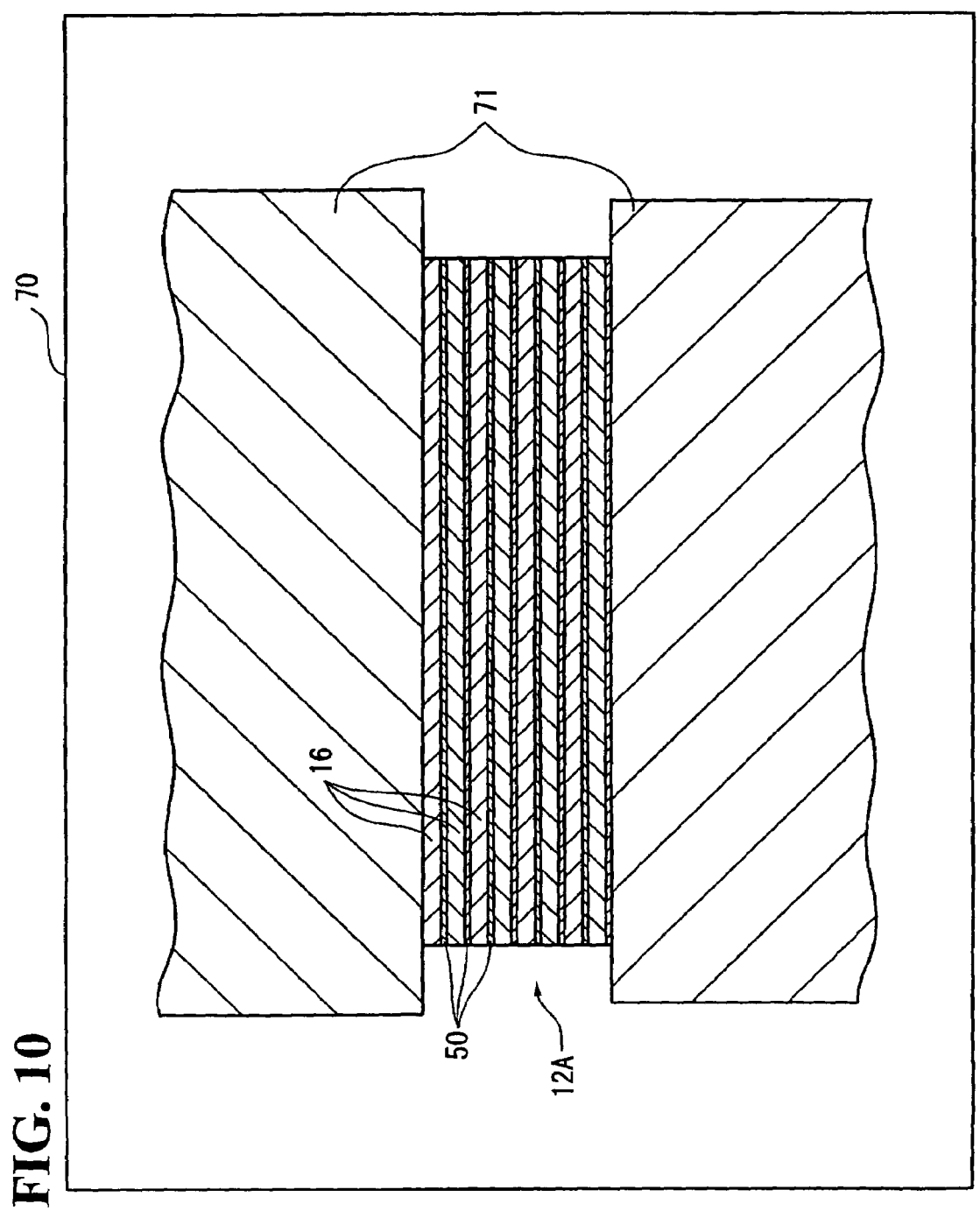
FIG. 10 is a view of a diagram showing a fastening step and an annealing step of the stator material.

FIG. 10 is a schematic view showing the fastening step and the annealing step. As shown in FIG. 10, in the fastening step and the annealing step, a load applying procedure to arrange the stator material 12A in which the magnetic core portions 16 are laminated within an oxygen-free furnace 70 using inert gas (using Ar gas, nitrogen gas, etc.) and applying a load at a predetermined load value in the direction in which the magnetic core portions 16 are brought nearer to one another is first carried out. The load applying procedure is carried out using a predetermined jig 71 to pressure the magnetic core portions 16 in the direction in which they are brought nearer to one another. At least a portion of the jig 71 that is in contact with the magnetic core portion 16 is subjected to plating composed of nickel and PTFE (Poly Tetra Fluoro Ethylene). Therefore, adhesives which have jutted out of the magnetic core portion 16 are satisfactorily prevented from being fastened to the jig 71. Each of the magnetic core portions 16 is pressed by the jig 71 so that the adhesive layer 50 between the magnetic core portions 16 satisfactorily adheres to the magnetic core portions 16 on both sides thereof.

Here, in the load applying procedure, a part of the temporary fixing portion 18 is covered with the jig 71, and is also interposed and pressed by the jig 71. When the magnetic core portion 16 is pressed by the jig 71, therefore, the temporary fixing portion 18 is also pressed and is bent again to coincide with the plane of the magnetic core portion 16. Consequently, the load applying procedure also serves as a temporary fixing portion correcting procedure in which the plane of the bent temporary fixing portion 18 is returned by bending to the plane direction of the magnetic core portion 16 to coincide with the plane of the magnetic core portion 16.

By heating the stator material 12A at a suitable temperature in a state in which the magnetic core portions 16 are pressed by the jig 71 to adhere to one another, the fastening step and the annealing step are continuously carried out within the same oxygen-free furnace 70. The fastening step and the annealing step are carried out by setting a fastening and annealing temperature within a range which is common between the range of a proper setting temperature and the range of a proper annealing temperature of the adhesives. That is, the steps are carried out under conditions of a fastening and annealing temperature of 200° C. to 500° C. (not less than 200° C. nor more than 500° C.) at which the adhesive layer 50 composed of heat-resistant resin is set and the magnetic core portion 16 can be annealed. Here, if it is considered that the setting temperature of the heat-resistant resin is approximately 260° C., for example, the most suitable annealing temperature of Co (cobalt)-based amorphous is approximately 400° C., and the crystallization temperature of the amorphous is approximately 550° C., it is found that both the fastening of the adhesive layer 50 and the annealing of the magnetic core portion 16 can be satisfactorily performed if the fastening and annealing temperature is set within the range of 200° C. to 500° C. Specifically, when Co (cobalt)-based amorphous is used, the in-furnace temperature is raised in approximately 30 minutes to one hour from an ordinary temperature to 400° C.±10° C. as the first stage (start to end of the fastening step, and start of the annealing step). The in-furnace temperature is kept constant in approximately thirty minutes to one hour at 400° C.±10° C. as the second stage (end of the annealing step). The amorphous is then cooled within the oxygen-free furnace and is left as it is to the ordinary temperature as the third stage.

By the fastening step and the annealing step, the adhesive layer 50 interposed between the magnetic core portions 16 is set so that the magnetic core portions 16 are fastened to one another, and each of the magnetic core portions 16 is annealed, thereby ensuring the magnetic properties. In the stage in which the fastening step and the annealing step are terminated, the plane of the temporary fixing portion 18 coincides with the plane of the magnetic core portion 16 in the temporary fixing portion correcting procedure.

In the step S6 shown in FIG. 3, the coil 13 is wound around the stator material 12A manufactured by such a manufacturing method. Further, the coil conducting substrate 15 is bonded to at least the surfaces of the stator material 12A on which the adhesive layer 50 is formed. In the step S7 shown in FIG. 3, the stator material 12A is fixed to the bottom plate 30 by the fixing holes 17.

According to the first embodiment, the following effects are obtained.

(1) The temporary fixing portion 18 is formed at a part of the peripheral edge of the magnetic core portion 16 in the temporary fixing portion forming step, and the connecting portion 43 is cut in the cutting step and at the same time, the laminated magnetic core portions 16 are temporarily fixed to one another by being pressed in carrying out the cutting step. Consequently, a step for temporary fixing need not be separately provided, and the magnetic core portions 16 can be temporarily fixed with ease, thereby allowing the manufacturing step of the stator material 12A to be rapidly simplified. Since the magnetic core portions 16 are temporarily fixed to one another, the magnetic core portions 16 can be also handled in a laminated state in the subsequent fastening step or the like, thereby allowing the ability of core portions 16 to be handled to be improved. That is, in a conventional case in which the magnetic core portions are laminated after being annealed, the material can be made brittle by the annealing, and the handling becomes difficult. Thus, the percentage of defects such as cracks or chips is increased. However, with the present invention the percentage of defective material can be made lower when compared to conventional cases.

(2) The adhesive layer 50 is formed on one surface of the base material 40 in the coating step. When the base materials 40 each having the magnetic core portions 16 formed therein are laminated, therefore, each adhesive layer 50 is interposed between the magnetic core portions 16. Consequently, the necessity of conventional adhesives having an impregnating step or the like is eliminated, thereby making it possible to simplify the manufacturing steps as well as to shorten working time. Furthermore, the surface of the base material 40 having the higher surface accuracy is coated with the adhesive layer 50 so that the adhesive layer 50 can be formed to a more uniform thickness on the base material 40, and a stable fastening force can be obtained over the whole surface of the magnetic core portion 16. Furthermore, the adhesive layer 50 is composed of heat-resistant resin. Therefore, the heating temperature in the fastening step can be set to a relatively high value, thereby allowing the annealing step to be continuously carried out. This also allows the step of manufacturing the stator material 12A to be simplified.

(3) The annealing step is carried out simultaneously with the fastening step. Therefore, the manufacturing steps can be simplified, as described above, and therefore the manufacturing efficiency can be improved. Further, there is no disadvantage that the annealing performance suffers no disadvantage with the present invention and is not made inferior by a fastening force of the adhesives when compared with that in a conventional case in which annealing is performed after fastening, thereby allowing good magnetic properties to be obtained. Further, the necessity of individually handling the magnetic core portions 16 which are higher in fragileness than those in a case where fastening is performed after annealing is eliminated, thereby allowing the ability to handle the magnetic core portions 16 to be improved. Furthermore, the fastening and annealing temperature is set within a range of 200° C. to 500° C. so that setting of the adhesives and annealing can be simultaneously performed, thereby allowing the manufacturing efficiency to be improved. Since the fastening and annealing temperature is suitably set, the effects of adhesives setting and annealing are reliably and satisfactorily obtained, thereby allowing a necessary fastening force and good magnetic properties to be obtained.

(4) The thickness of the adhesive layer 50 is set within a range of 1 to 15 μm and more desirably within a range of 2 to 8 μm. Even if consideration is given to the surface roughness of an amorphous magnetic substance, which is the material for the magnetic core portion 16, the adhesive layer 50 in the magnetic core portion 16 can be bonded to the magnetic core portion 16 in the adjacent layer, and the magnetic core portions 16 can be reliably fastened to one another. In blanking the blanking portion from the base material 40 in the magnetic core portion forming step, the surface of the base material 40 on which the adhesive layer 50 is formed, is arranged opposite to the die 61. Thus, the burr 40A by the pressing is formed on the surface on which the adhesive layer 50 is formed. Consequently, it is possible to absorb the burr 40A in the thickness of the adhesive layer 50, to prevent the thickness of the whole stator material 12A from being increased in a case where the magnetic core portions 16 are laminated, and to easily promote the thinning of the stator material 12A.

(5) As the dimensions of the temporary fixing portion 18, the width W thereof along the peripheral edge of the magnetic core portion 16 is set in a range of 0.3 mm to 1.0 mm, and the length L thereof along the notch 18A is set in a range of 0.2 mm to 1.0 mm. In the temporary fixing portion forming step, therefore, the notch 18A can be formed without causing damage to an overall shape, for example, bending of the temporary fixing portion 18, and the temporary fixing portion 18 can be satisfactorily bent. Further, the dimensions of the temporary fixing portion 18 are suitably set so that necessary strength and a necessary temporary fixing force can be ensured in the temporary fixing portion 18. In the temporarily fixed state, the temporary fixing portion 18 is bent so that the predetermined angle θ to the plane of the magnetic core portion 16 is set within a range of 5° to 45°. Therefore, the laminated magnetic core portions 16 can be temporarily fixed reliably. The distance M from the front end of the temporary fixing portion 18 to the plane of the magnetic core portion 16 is set within a range of 1.5 times to 10 times the plate thickness d of the magnetic core portion 16. Therefore, the temporary fixing portion 18 reliably reaches the magnetic core portion 16 which is one or a plurality of layers below the magnetic core portion 16 having the temporary fixing portion 18 formed therein, and can temporarily fix the magnetic core portion 16. Therefore, the laminated magnetic core portions 16 can be temporarily fixed more reliably.

(6) The temporary fixing portions 18 are provided on both sides of the magnetic path in the magnetic core portion 16 formed in the stator material 12A so that they can temporarily fix the magnetic core portion 16, which is one or a plurality of layers below the magnetic core portion 16 having the temporary fixing portions 18 formed therein from both sides thereof, thereby making the temporary fixing more reliable.

The temporary fixing portions 18 are formed at two positions on the same side along the peripheral edge of the magnetic core portion 16, that is, along the magnetic path. Therefore, layers to the magnetic core portion which is one or a plurality of layers below the magnetic core portion 16 having the temporary fixing portions 18 formed therein can be also temporarily fixed stably in the direction along the magnetic path. Furthermore, the temporary fixing portion 18 is formed at the position where the magnetic flux density is lower than the magnetic flux density in the magnetic path formed in the stator material 12A. Therefore, it is possible to prevent the formation of the magnetic path from being obstructed by the formation of the temporary fixing portion 18 and to form satisfactorily the magnetic path even if the temporary fixing portion 18 is formed at the peripheral edge of the magnetic core portion 16. This allows good generation performance of the generator 10 to be ensured.

(7) In the temporary fixing forming step, the notches 18A are formed at the peripheral edge of the magnetic core portion 16, and the temporary fixing portion 18 is formed by bending the peripheral edge between the notches 18A. Therefore, the temporary fixing portion 18 can be formed integrally with a part of the magnetic core portion 16, and the necessity of the steps such as the step of bonding another component is eliminated, thereby allowing the manufacturing steps to be simplified. Furthermore, the temporary fixing portion 18 is formed by forming the notches 18A in the magnetic core portion 16. If the temporary fixing portion 18 is laminated on the other magnetic core portion 16, therefore, the temporary fixing portion 18 is fitted between the notches 18A in the other magnetic core portion 16. Since the temporary fixing portion 18 temporarily fixes the other magnetic core portion 16 by running fit, the temporary fixing can be performed more reliably. Even when the magnetic core portions 16 are handled by being laminated, therefore, the ability of the magnetic core portions 16 to be handled can be improved without separating the magnetic core portions 16 from one another. Further, each magnetic core portion 16 can be reliably positioned by the temporary fixing. This also allows the ability to handle the magnetic core portions 16 to be improved.

(8) The load applying procedure is carried out in the fastening step so that the magnetic core portions 16 are reliably bonded to one another in the case of heating, thereby allowing a good and stable fastening force to be obtained over the whole surface of the magnetic core portion 16. Accordingly, problems such as stripping between the magnetic core portions 16 can be satisfactorily prevented. Furthermore, the surface of the jig 71 used in the load applying procedure is plated with PTFE (Poly Tetra Fluoro Ethylene) so that adhesives which have jutted out of the peripheral edge of the magnetic core portion 16 as the load is applied can be prevented from adhering to the jig 71. Consequently, problems such as fastening of the magnetic core portion 16 to the jig 71 with the adhesives which have jutted out can be prevented, thereby allowing the yield of the stator material 12A to be improved. This allows the durability of the jig 71 to be improved.

(9) The temporary fixing portion correcting procedure is carried out simultaneously with the fastening step and the annealing step. The plane of the temporary fixing portion 18 projecting from the plane of the magnetic core portion 16 due to the temporary fixing coincides with the plane of the magnetic core portion 16. When the plurality of magnetic core portions 16 are laminated to manufacture the stator material 12A, the thickness of the stator material 12A is approximately equal to the thickness of the laminated magnetic core portions 16, thereby making it possible to prevent the thickness of the stator material 12A from being increased. This allows the thickness of the stator material 12A to be reduced, thereby promoting the thinning of the stator material 12A. Since the stator material 12A is formed with the fixing holes 17, the stator material 12A can be easily fixed to the bottom plate 30 after it is manufactured.

(10) The annealing step is carried out within the oxygen-free furnace 70. Therefore, the annealing effect can be reliably obtained, thereby allowing magnetic properties required for the stator material 12A to be ensured reliably and satisfactorily.

(11) The coil conducting substrate 15 is arranged on the surface of the stator material 12A on which the adhesive layer 50 is formed. Therefore, the coil conducting substrate 15 can be attached utilizing the fastening force of the adhesive layer 50 previously formed in the magnetic core portion 16, thereby allowing the manufacturing steps and work for attaching the coil conducting substrate 15 to be simplified.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

Alternate Embodiments

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

A second embodiment of the present invention will be described. The second embodiment is an embodiment in which an electromagnetic transducer according to the present invention is applied to an antenna in a radio controlled timepiece.

Figure 11:
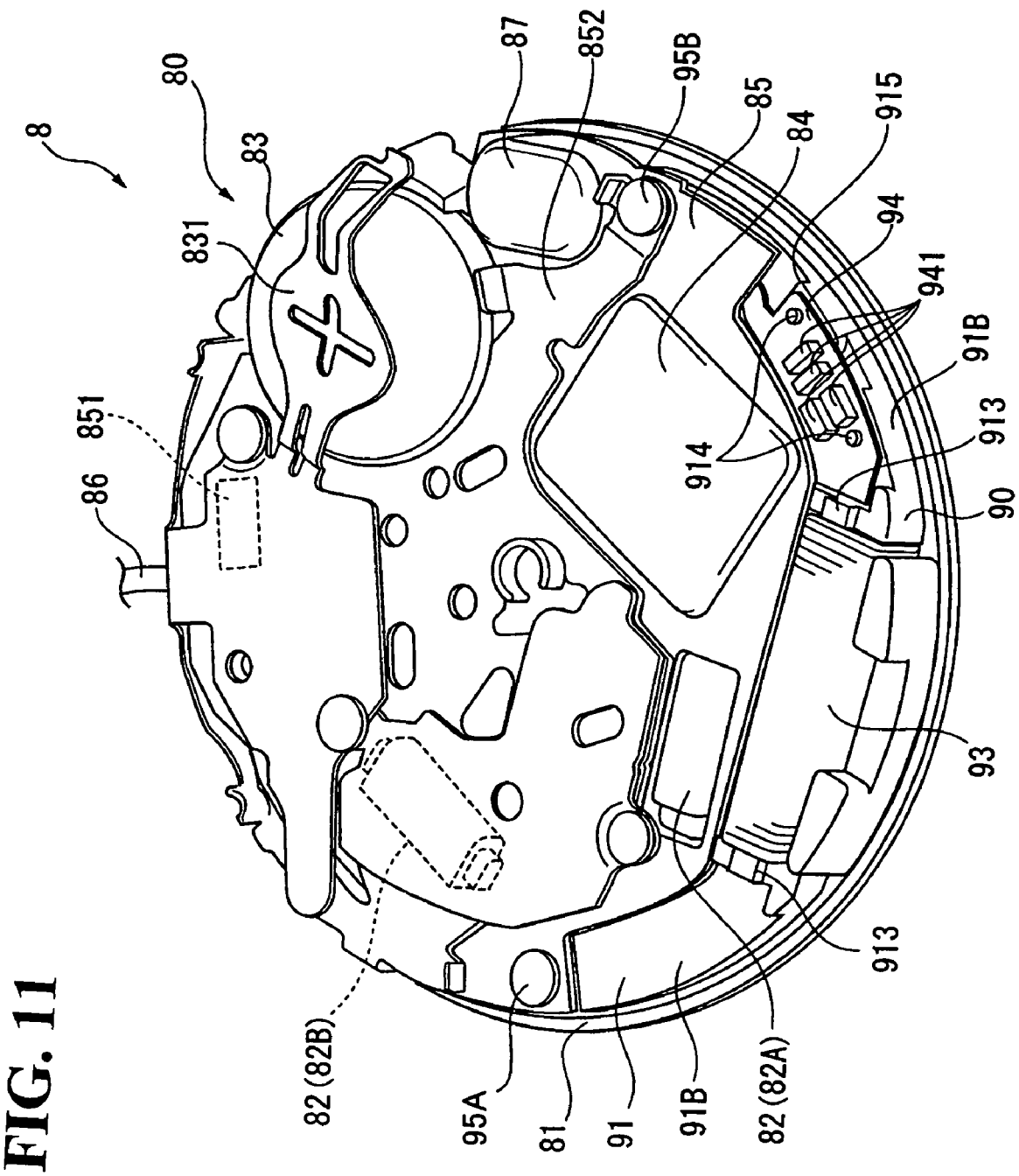
FIG. 11 is a perspective view showing the whole of a timepiece according to a second preferred embodiment of the present invention.
Figure 12:
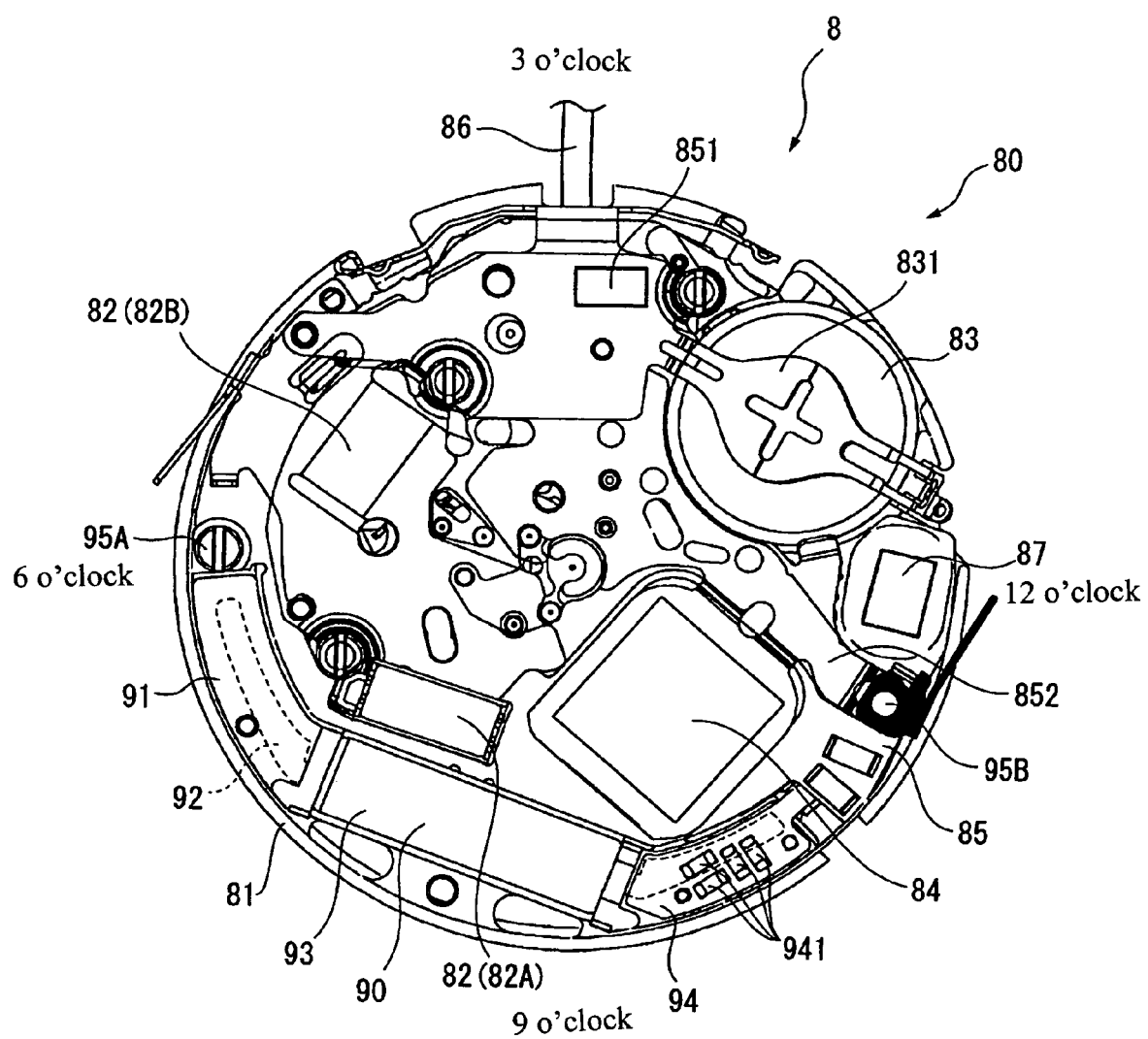
FIG. 12 is a plan view showing the whole of the timepiece of the second embodiment.

FIG. 11 is a perspective view showing a movement-holder 80 in a timepiece 8 serving as an electronic device according to the second embodiment of the present invention. FIG. 12 is a plan view showing the movement-holder 80. In the present embodiment, the timepiece 8 is a radio controlled timepiece that corrects display time upon receipt of standard radio waves on which time information is superimposed. In FIGS. 11 and 12, the movement-holder 80 is accommodated in a case (not shown) of the timepiece 8, and components for driving the timepiece 8 are arranged on a bottom plate 81. An index (not shown) having a second hand, a minute hand, and an hour hand, two stepping motors 82 (82A, 82B) to drive the index, a gear-train (not shown) to transmit the rotation of the stepping motor 82 (82A, 82B) to the index, a battery 83 serving as a driving source, a circuit block 85 on which a CPU 84 or the like serving as control unit to control the operation of the timepiece 8 is mounted, a radio wave receiving antenna 90 serving as an electromagnetic transducer for receiving standard radio waves, and so on are arranged on the bottom plate 81. Further, a pendant winding-mechanism 86 to regulate manually the position of the index is provided in the direction of 3 o'clock in the timepiece 8.

The stepping motor 82 includes the stepping motor 82A for a second hand and the stepping motor 82B for a minute hand and an hour hand. The stepping motors 82A and 82B are respectively disposed in the direction of about 8 o'clock and the direction of about 5 o'clock in the timepiece 8. The stepping motors 82A and 82B are respectively connected to the index at the center of the movement-holder 80 through the independent gear-trains so that the second hand, the minute hand, and the hour hand can be independently driven.

The battery 83 (which may be a primary battery or a secondary battery) is disposed in a direction from about 1 o'clock to about 2 o'clock in the timepiece 8 so that conduction is achieved by a battery holder 831 having spring properties and at the same time, the battery 83 is held in the bottom plate 81.

The circuit block 85 includes a quartz tuning-fork oscillator for timing 851 to oscillate a reference timepiece, the above-mentioned CPU 84, a quartz tuning-fork oscillator for a band-pass filter (not shown) to pass only a signal having standard radio waves, a receiving IC (a receiving circuit) 87 to process the standard radio waves received by the radio wave receiving antenna 90, and so on. The circuit block 85 is fixed to the bottom plate 81 by being interposed between a circuit holder 852 and the bottom plate 81 and screwed.

The quartz, tuning-fork oscillator for timing 851 is disposed in the direction of about 3 o'clock in the timepiece 8. As the quartz tuning-fork oscillator for a band-pass filter, there are provided two quartz tuning-fork oscillators, i.e., a quartz tuning-fork oscillator to filter standard radio waves of 60 kHz and a quartz tuning-fork oscillator for filtering standard radio waves of 40 kHz. In Europe, for example, a quartz tuning-fork oscillator for 60 kHz and a quartz tuning-fork oscillator for 77.5 kHz may be used.

The CPU 84 has a frequency division circuit disposed in a direction from about 9 o'clock to 11 o'clock in the timepiece 8 to divide the frequency from the quartz tuning-fork oscillator 851 to generate a reference timepiece, a timing circuit to count the reference timepiece to measure time, a control circuit to control the stepping motors 82A and 82B on the basis of a signal from the timing circuit, and so on.

The receiving IC 87 has a demodulation circuit to demodulate the standard radio waves received by the radio receiving antenna 90, and an amplification circuit to amplify a receiving signal, and so on.

The radio wave receiving antenna 90 is arranged within the movement-holder 80, is disposed in the direction of about 9 o'clock in the timepiece 8, and occupies a space in the direction of about 7 o'clock to the direction of about 12 o'clock. Here, the radio wave receiving antenna 90 is arranged at a position spaced apart from the battery 83 within the movement-holder 80. When the radio wave receiving antenna 90 receives the standard radio waves, therefore, the effect of a metal outer can (using an SUS (stainless steel) 304, for example) of the battery 83 on the receiving of the standard radio waves can be kept to a minimum. The radio wave receiving antenna 90 and the receiving IC 87 are arranged in close proximity to each other within the movement-holder 80. When a receiving signal from the radio wave receiving antenna 90 to the receiving IC 87 flows, therefore, the signal is hardly degraded and noise is hardly contained so that good signal receiving in the receiving IC 87 is performed. The CPU 84 and the stepping motor 82A are arranged inside (near the center) of the radio wave receiving antenna 90 in a range where they do not interfere with the radio wave receiving antenna 90.

Here, it is desirable that an upper part (a surface on the side of a back cover) of the radio wave receiving antenna 90, the CPU 84, and the stepping motor 82A is not covered with a conductive material such as a metal plate in order to improve the receiving sensitivity of the standard radio waves. It is desirable that a material for the bottom plate 81 at positions where the radio wave receiving antenna 90, the CPU 84, and the stepping motor 82A are placed, on the bottom plate 81 is a non-conductive material such as synthetic resin or ceramics in order to improve the receiving sensitivity of the standard radio waves.

Figure 13:
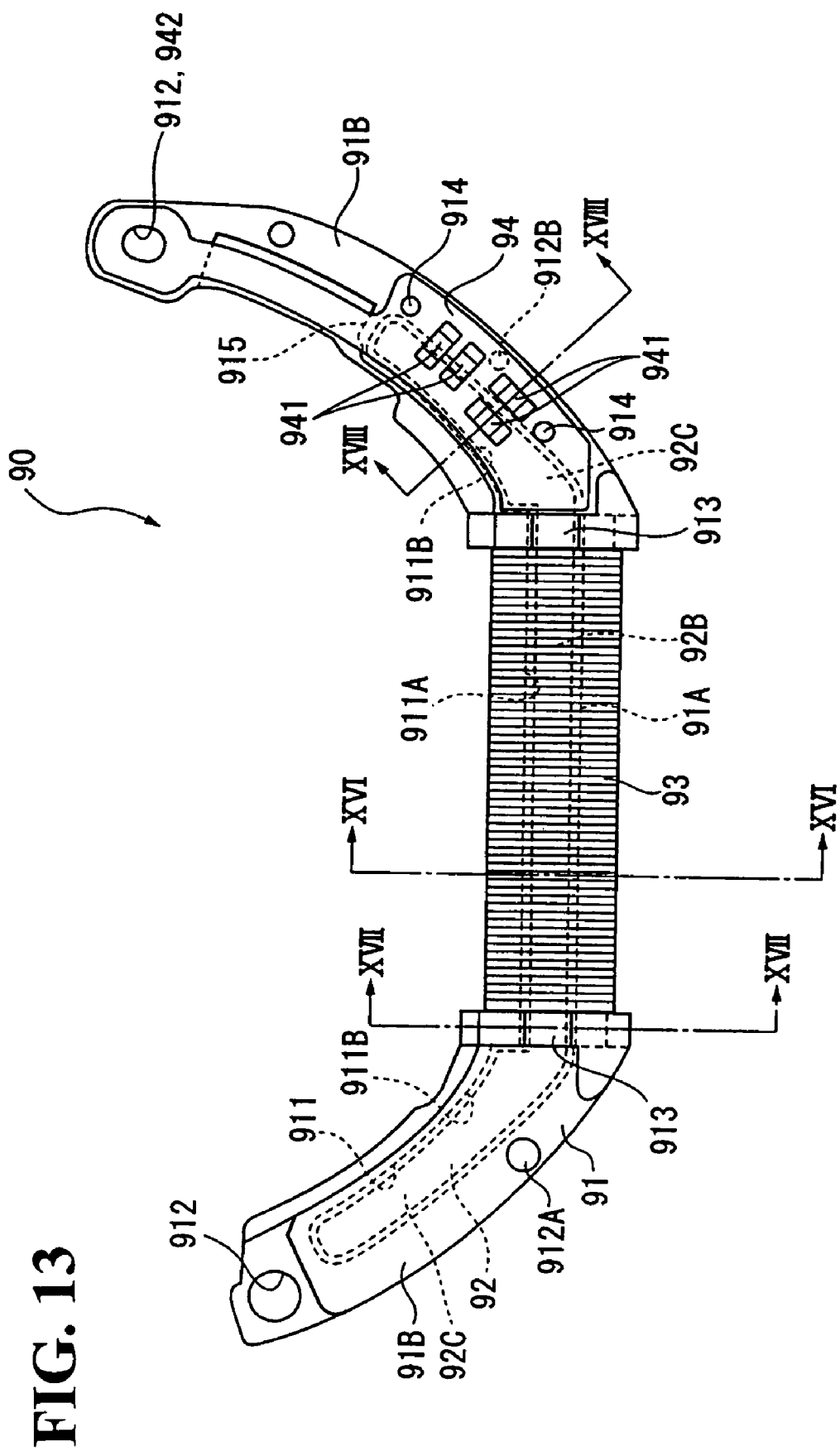
FIG. 13 is a plan view showing a radio wave receiving antenna of the timepiece of the second embodiment.
Figure 14:
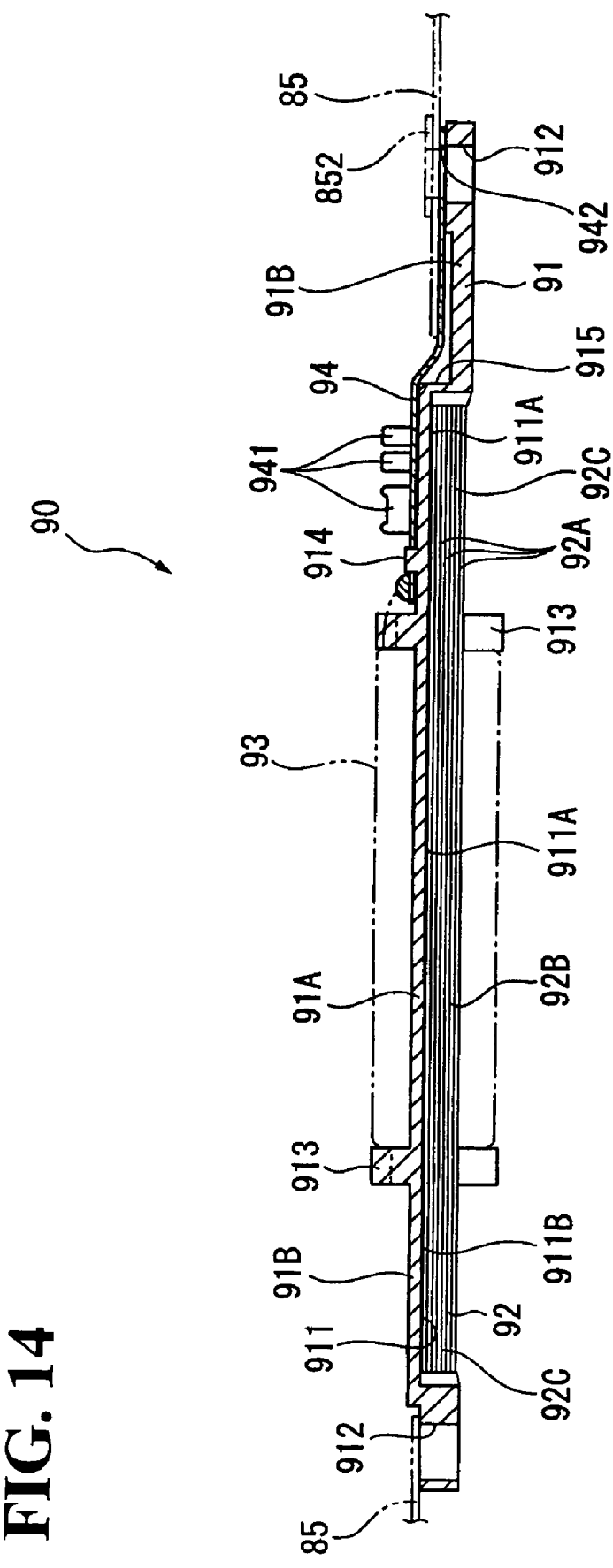
FIG. 14 is a side sectional view showing the radio wave receiving antenna.

FIG. 13 is a plan view of the radio wave receiving antenna 90, and FIG. 14 is a side sectional view of the radio wave receiving antenna 90. As shown in FIGS. 13 and 14, the radio wave receiving antenna 90 has a coil frame 91 having a recess 911 formed therein, a core (a magnetic core) 92 accommodated in the recess 911, and a coil 93 wound around the coil frame 91.

Figure 15:
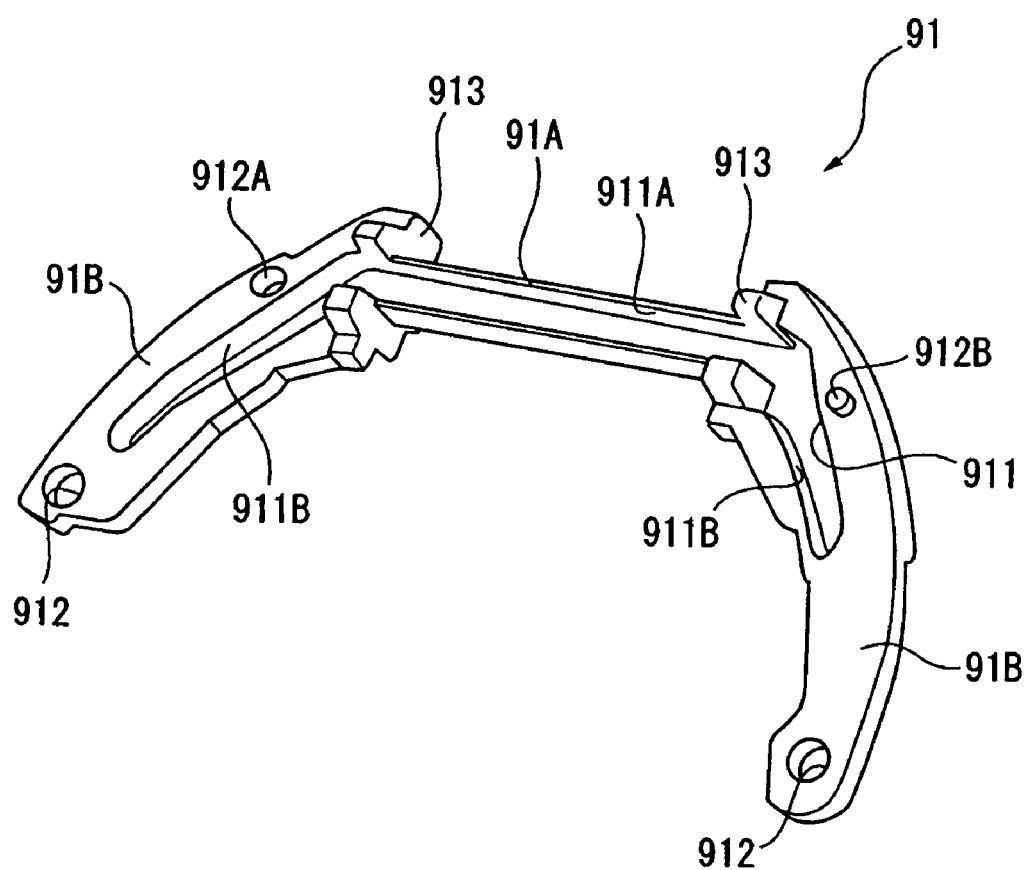
FIG. 15 is a perspective view showing a coil frame of the radio wave receiving antenna.

FIG. 15 is a perspective view of the coil frame 91. As shown in FIG. 15 and FIGS. 13 and 14, described above, the coil frame 91 has a linear portion 91A around which the coil 93 is wound and curved portions 91B continuously formed on both sides of the linear portion 91A. The curved portion 91B is formed along an outer edge of the bottom plate 81, and is formed in a substantially circular arc shape when the outer shape of the bottom plate 81 is a circle and is a substantially elliptically curved shape when the outer shape of the bottom plate 81 is an ellipse, for example. Here, the linear portion 91A is disposed in a direction from about 8 o'clock to about 9 o'clock in the timepiece 8, as shown in FIG. 12, described above. The curved portions 91B are formed and arranged along the outer shape of the movement-holder 80. One of the curved portions 91B is disposed in a direction from about 6 o'clock to about 7 o'clock in the timepiece 8, and the other curved portion 81B is disposed in a direction from about 9 o'clock to about 11 o'clock in the timepiece 8. The coil frame 91 is composed of an insulating material, for example, synthetic resin such as a liquid crystal polymer.

The coil frame 91 is formed with the recess 911 along the outer shape of the coil frame 91. That is, in the recess 911, a linear portion 911A arranged in a part of the linear portion 91A and a curved portion 91B arranged in a part of the curved portion 91B are continuously formed.

Figure 16:
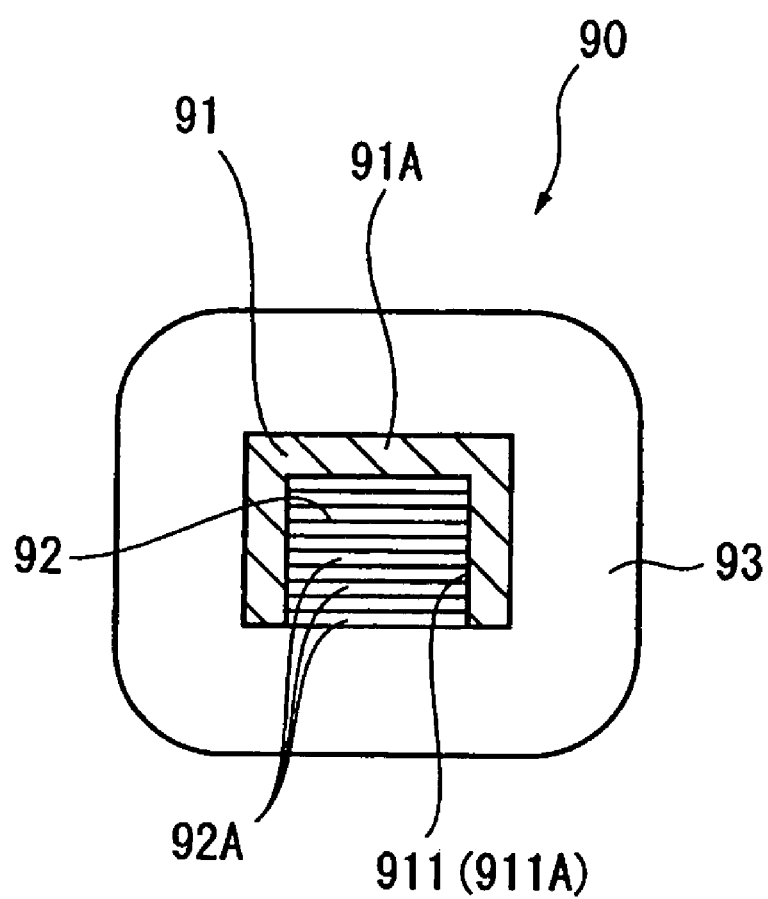
FIG. 16 is a cross-sectional view taken along a line XVI-XVI shown in FIG. 13.

FIG. 16 is a cross-sectional view taken along a line XVI-XVI shown in FIG. 13. As also shown in FIG. 16, the recess 911 is formed in a substantially rectangular shape with one line segment missing, i.e., like the character ko from the Japanese katakana syllabary in cross section. An opening of the recess 911 is arranged opposite to the bottom plate 81.

Returning to FIGS. 13, 14, and 15, fixing holes 912 to screw the radio wave receiving antenna 90 to the movement-holder 80 are formed at both ends of the coil frame 91 as shown in FIG. 11, one of the fixing holes 912, together with an end of the circuit block 85, is fixed to the bottom plate 81 by a screw 95A. The other fixing hole 912, together with the circuit block 85 and a circuit holder 852, is fixed by a screw 95B. Consequently, parts of the fixing holes 912 at both ends of the coil frame 91 are covered with the circuit block 85, and are arranged at positions that are overlapped with each other as viewed from the top of the timepiece 8.

As seen in FIGS. 11-15, positioning portions 912A and 912B to position the radio wave receiving antenna 90 with respect to the bottom plate 81 are respectively formed on surfaces, opposite to the bottom plate 81, of the curved portions 91B. Out of the positioning portions 912A and 912B, the one positioning portion 912A is a hole, and the other positioning portion 912B is a projection. On the other hand, in the bottom plate 81, a pin and a recess are respectively formed at positions corresponding to the positioning portions 912A and 912B. Further, the positioning portions 912A and 912B are respectively engaged with the pin and the recess so that the radio wave receiving antenna 90 is positioned with respect to the bottom plate 81.

The coil frame 91 is formed with flanges 913 on both sides of the coil 93.

Figure 17:
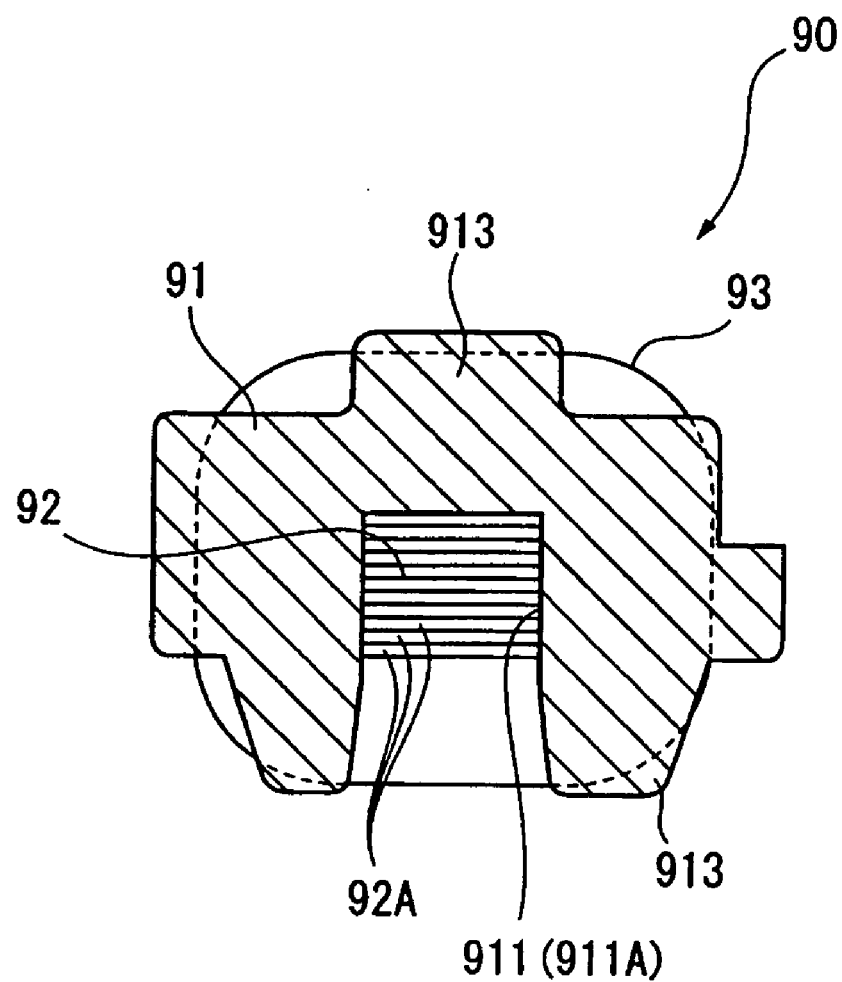
FIG. 17 is a cross-sectional view taken along a line XVII-XVII shown in FIG. 13.

FIG. 17 is a cross-sectional view taken along a line XVII-XVII shown in FIG. 13. As shown in FIG. 17, the flanges 913 are formed to project respectively from the four sides of the linear portion 91A, and the amount of the projection is set to a larger value than the thickness of the coil 93. Further, portions corresponding to an opening of the recess 911, of the flange 913 are formed to project respectively toward both sides of the opening. The thickness of the flange 913 is set to a larger value than the thickness of the coil 93. Accordingly, the coil 93 is barraged by the flange 913 and is not wound around the curved portion 911B.

Figure 18:
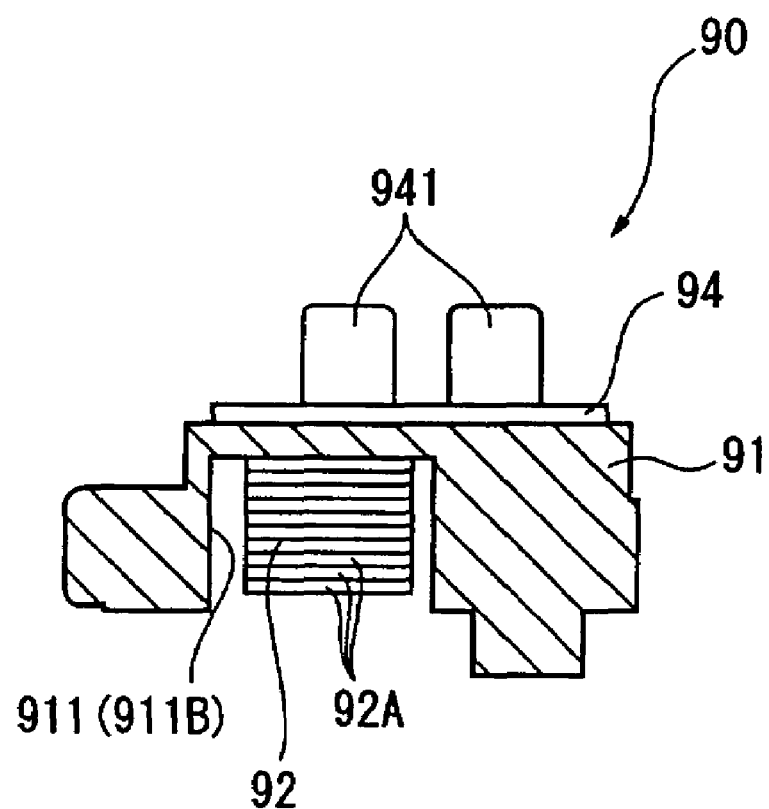
FIG. 18 is a cross-sectional view taken along a line XVIII-XVIII shown in FIG. 13.

FIG. 18 is a cross-sectional view taken along a line XVIII-XVIII shown in FIG. 13. As shown in FIG. 18 and FIGS. 13 and 14, described above, a circuit board 94 is fixed on the opposite side of a surface opposite to the bottom plate 81 to the curved portion 91B closer to the receiving IC 87 in the coil frame 91. On a surface, opposite to the circuit board 94, of the coil frame 91, a plurality of projections 914 (two in FIG. 13) are formed. Further, positioning holes of the circuit board 94 are respectively engaged with the projections 914 so that the circuit board 94 is positioned with respect to the coil frame 91. The circuit board 94 is curved and formed along the shape of the curved portion 91B, and is fixed to the plane of the coil frame 91 by being bonded with epoxy resin adhesives. A conductive pattern is formed on the circuit board 94, and a plurality of capacitors 941 serving as electric elements for tuning frequency adjustment in the radio wave receiving antenna 90 is mounted at positions which are overlapped in plane with a core 92 on the circuit board 94.

Returning to FIG. 13, a fixing hole 942 to fix the circuit board 94 is formed at a position that coincides with the fixing hole 912 in the coil frame 91 at an end of the circuit board 94. A terminal (not shown) of a conductive pattern is formed around the fixing hole 942. As best seen in FIG. 11, the circuit board 94 is interposed between the circuit block 85 and the coil frame 91, and is fixed by the screw 95B. Here, as seen in FIGS. 11 and 13, a terminal conducted to the terminal of the circuit board 94 is formed at a position opposite to the circuit board 94 in the circuit block 85 (i.e., around the fixing hole 842). Consequently, the circuit block 85 and the circuit board 94, together with the coil frame 91, are fixed by the screw 95B, so that the circuit block 85 is opposed to and brought into contact with the circuit board 94, conduction between the circuit board 94 and the circuit block 85 is achieved, and the capacitor 94 is connected to the receiving IC 87.

A front end of the coil 93 is soldered to an end on the opposite side of the fixing hole 942 in the circuit board 94, to achieve conduction from a conductive pattern.

Here, a stepped portion 915 is formed in an area, closer to the fixing hole 912 than a position where the capacitor 941 is formed on a surface opposite to the circuit board 94 of the coil frame 91. The circuit board 94 is folded or curved in a direction nearer to the bottom plate 81 along the stepped portion 915. Even if the circuit block 85 is overlapped in plane with the coil frame 91 (the circuit board 94), therefore, the circuit block 85 does not project in the thickness direction of the coil frame 91, thereby preventing the thickness of the movement-holder 80 from being increased.

The core 92 is constructed by laminating a plurality of amorphous metal thin plates 92A each formed of a thin plate of an amorphous metal mainly composed of Co, for example, constructed by laminating 30 to 50 amorphous metal thin plates 92A each having a thickness of approximately 10 μm, as shown in FIG. 14 and FIGS. 16 to 18.

Figure 19:
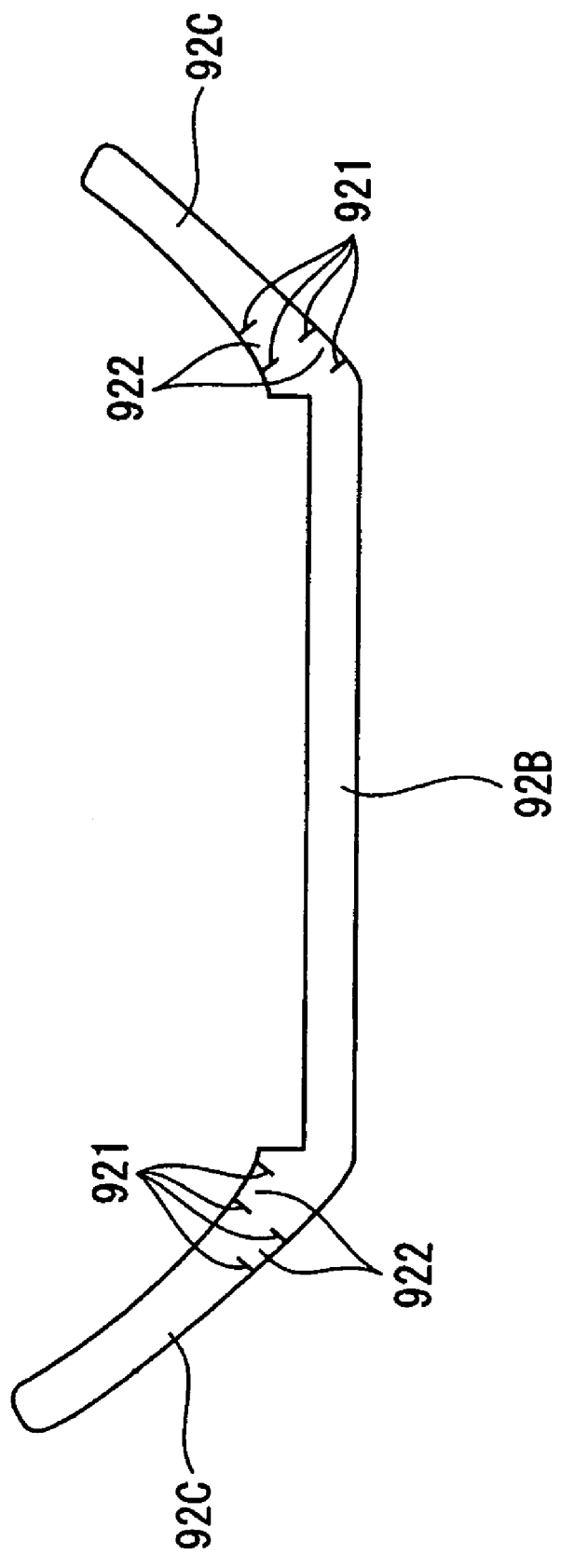
FIG. 19 is a plan view showing a magnetic core.

FIG. 19 is a plan view of the core 92. As also shown in FIGS. 13 and 19, the core 92 has a liner portion 92B that has a shape along the recess 911 in the coil frame 91, that is, around which the coil 93 is wound and curved portions 92C each having a substantially circular arc shape in the plane along the recess 911 on both sides of the linear portion 92B. The amorphous metal thin plates 92A are bonded to one another with adhesives, and the core 92 is fixed to the recess 911 with adhesives with which a clearance between the core 92 and the recess 911 is filled. The core 92 is manufactured similar to the stator material 12A in the first embodiment, and a temporary fixing portion 922 is formed between two notches 921 parallel to each other in the curved portion 92C in the core 92. A plurality of temporary fixing portions 922 (four in the present embodiment) are formed at a peripheral edge of the core 92. Two of the four temporary fixing portions 922 are arranged outside the curved portion 92C, and the other two temporary fixing portions 92C are arranged inside the curved portion 92C.

The coil 93 is wound around the linear portion 91A in the coil frame 91. The line diameter, the winding number, and so on of the coil 93 are suitably set in consideration of the material for the coil 93, the receiving sensitivity of the radio wave receiving antenna 90, and so on. The surface of the coil 93 is previously coated with the adhesives. If the coil 93 is wound around the coil frame 91 while applying hot air by a heater, the coil 93 is bonded to the coil frame 91.

The foregoing timepiece 8 performs the following operations as shown in FIG. 11.

An oscillation signal outputted when a voltage is applied to the quartz tuning-fork oscillator for timing 851 is frequency-divided by the frequency division circuit in the CPU 84 to generate a reference signal. The time is measured by the timing circuit within the CPU 84 on the basis of the reference signal, and the stepping motors 82A and 82B are driven. The rotations of the stepping motors 82A and 82B are respectively transmitted to the second hand, the minute hand, and the hour hand, through the gear-trains, and the index is rotated so that the time is displayed on the dial of the timepiece 8.

When the standard radio waves having the time information placed thereon are received by the radio wave receiving antenna 90, the receiving IC 87 extracts the time information from the standard radio waves and outputs the extracted time information to the CPU 84. The CPU 84 corrects the time measured by the timing circuit on the basis of the time information, and drives the stepping motors 82A and 82B to correct the display time by the index.

According to the second embodiment, the following effects are obtained in addition to the same effects as the effects (1) to (11) in the first embodiment.

(12) The core 92 is constructed by laminating the amorphous metal thin plates 92A, and is accommodated in the recess 911 in the coil frame 91, so that a sharp warp, burr, or the like of the outer edge that occurs in forming the amorphous metal thin plate 92A is not brought into contact with the coil 93, thereby making it possible to prevent the coil 93 from being disconnected. Consequently, problems such as disconnection of the coil 93 during winding work of the coil 93 can be solved, thereby making it possible to simplify the winding work and to improve the yield. Since the coil 93 can be prevented from being disconnected by vibration, shock, and so on during the use of the timepiece 8, the reliability of the timepiece 9 can be improved. Furthermore, compared with a conventional case in which the amorphous metal laminate is coated with the insulating film in order to prevent the coil 93 from being disconnected, the necessity of the insulating film can be eliminated, thereby allowing the structure of the radio wave receiving antenna 90 to be simplified, and the necessity of the coating work of the insulating film is eliminated, thereby allowing the manufacturing steps to be simplified. Further, the recess 911 in the coil frame 91 is formed in a katakana ko shape in cross section, so that the amorphous metal thin plate 92A may be accommodated from the opening of the recess 911, thereby making it possible to simplify the accommodating work as well as to simplify the fixing, within the recess 911, of the amorphous metal thin plates 92A. Since the core 92 is composed of an amorphous metal, the receiving sensitivity of the radio wave receiving antenna 90 can be improved, as compared with those in a case where the core 92 is composed of ferrite or other materials.

(13) The coil frame 91 is provided with the flange 913, thereby making it possible to prevent reliably the coil 93 from being unwound and moved to the curved portion 91B in performing work to wind the coil 93 around the coil frame 91. Consequently, the coil 93 can be wound by simple work. Further, the coil 93 can be prevented from being unwound by the flange 913, thereby making it possible to wind satisfactorily the coil 93 in a predetermined range and to ensure easily a desired winding number and coil length. Therefore, it is possible to restrain the variation in the receiving sensitivity of the radio wave receiving antenna 90, thereby making the stable receiving sensitivity feasible.

(14) The circuit board 94 having the capacitor 941 mounted thereon is fixed on the coil frame 91 so that a space of the coil frame 91 can be effectively utilized. That is, the coil frame 91 and the core 92 can be formed in a portion where the circuit board 94 is arranged so that the core 92 can be made longer, thereby allowing the receiving sensitivity of the radio wave receiving antenna 90 to be enhanced. Conversely, space saving within the movement-holder 80 can be promoted and therefore, the miniaturization of the timepiece 8 can be promoted.

(15) The coil frame 91 has the fixing hole 912, so that the radio wave receiving antenna 90 can be fixed to the bottom plate 81 by the screws 95A and 95B. Consequently, the radio wave receiving antenna 90 can be more stably and reliably fixed, when compared to the conventional configuration in which the radio wave receiving antenna is interposed by a circuit board, a gear-train receiver, or the like, thereby allowing the shock resistance of the radio wave receiving antenna 90 to be improved.

(16) The radio wave receiving antenna 90 is arranged within the movement-holder 80 so that the radio wave receiving antenna 90 does not project outward from the timepiece 8, thereby allowing the appearance of the timepiece 8 to be improved. Further, the curved portion 91B in the radio wave receiving antenna 90 is formed along the outer shape of the movement-holder 80. Therefore, it is possible to ensure the length of the core 92 while enhancing the space efficiency, and to promote the space saving and the miniaturization while ensuring the receiving sensitivity. Furthermore, the coil frame 91 is composed of an insulating material. When a metal material such as SUS, sulfur, a titanium alloy is employed for exterior components such as a middle, a dial, and a back cover, therefore, the metal material can be used as a material to ensure a suitable clearance (timing) between the radio wave receiving antenna 90 and the exterior component. Here, examples of a case in which the metal material is used for the exterior component include a case in which a surface composed of a non-conductive material such as synthetic resin or ceramics is coated with a metal material by plating, sputtering, evaporation, or the like in addition to a case where the whole of the external components is composed of a single metal material.

(17) The core 92 is accommodated in the coil frame 91. When shock is applied from the outside of the timepiece 8, the coil frame 91 can perform the function of a cushioning material for protecting the core 92. This makes it difficult to induce magnetic strain in the core 92. When the coil frame 91 is placed on the bottom plate 81, the core 92 is accommodated in the coil frame 91. Therefore, the core 92 need not be directly gripped by tweezers or the like, thereby allowing the ability to handle the core 92 to be improved. This also makes it difficult to induce magnetic strain in the core 92. As a result, when the structure of the radio wave receiving antenna 90 is applied to a stepping motor for a timepiece, for example, magnetic strain is not easily induced, so that power consumption can be reduced.

The present invention is not limited to the above embodiments. Modifications, improvements, and so forth in a range where an object of the present invention can be achieved are included in the present invention.

The adhesives are not limited to heat-resistant resin. For example, thermosetting resin may be used. In this case, the fastening and annealing temperature may be set to a relatively low temperature of not more than 300° C., for example. The fastening step and the annealing step may be respectively taken as separate steps to carry out the magnetic core portion forming step and the temporary fixing portion forming step, then carry out the coating step after the annealing step, and then carry out the laminating step, the cutting step, and the fastening step. In this case, the magnetic core portions can be also temporarily fixed simultaneously with the cutting step, so that the temporary fixing can be easily performed. Further, the magnetic core portion forming step, the temporary fixing portion forming step, and the laminating step may be simultaneously carried out by whole blanking press.

The adhesives are not limited to ones with which one surface of the magnetic core portion is coated. For example, both surfaces of the magnetic core portion may be coated with the adhesives. The adhesives are not limited to ones with which the whole surface of the magnetic core portion is coated. For example, a part of the magnetic core portion may be coated with the adhesives. In this case, the adhesives must be arranged such that a stable fastening force is obtained in the area where a sufficient fastening force can be ensured between the adhesives and the magnetic core portion and over the whole surface of the magnetic core portion. Accordingly, the plane of the magnetic core portion, for example, can be coated with the adhesives in an arbitrary arrangement is a lattice shape, a stripe shape, a dot shape, or the like.

The fastening step and the annealing step need not be carried out within the same furnace. They may be separately carried out.

The magnetic core portion forming step is not necessarily limited to the step of forming the residual base material portion and the connecting portion by blanking from the periphery of the magnetic core portion. For example, the magnetic core portion may be blanked from the base material by a punch and a die which have the shape of the magnetic core portion. In this case, a burr due to the pressing is formed on a surface opposite to the punch. Therefore, the magnetic core portions must be placed such that a surface on which an adhesive layer is formed is opposed to the punch. If the thickness of the magnetic core is not restricted, the burr due to the pressing need not be necessarily formed on the surface where the adhesive layer is provided. The burr may be formed on a surface where the adhesive layer is not provided.

The shape of the temporary fixing portion is not limited to that formed at the peripheral edge of the magnetic core portion by forming the two notches. For example, a projectionshaped temporary fixing portion may be formed in a part of the magnetic core portion by pressing or the like, for example. Also in this case, the adjacent magnetic core portion can be temporarily and satisfactorily fixed. The temporary fixing portion is not limited to one which temporarily fixes the other magnetic core portion by running fit. In addition thereto, it can perform the temporary fixing by a suitable engaging method such as caulking.

The temporary fixing is not limited to one simultaneously performed in the cutting step for cutting off the magnetic core portion from the connecting portion. For example, it may be performed in an arbitrary pressing step out of a series of pressing steps in which a magnetic core portion and a magnetic core are formed. That is, the temporary fixing may be performed not only simultaneously with the cutting step but also simultaneously with the pressing step for forming a fixing hole, the temporary fixing portion forming step, and so on, for example.

In the temporary fixing portion forming step and the magnetic core portion forming step, if a plurality of base materials are previously laminated to form simultaneously a plurality of magnetic core portions or temporary fixing portions, the plurality of base materials can be simultaneously processed, thereby allowing the production efficiency to be improved. Here, when the plurality of temporary fixing portions are simultaneously formed, the plurality of magnetic core portions can be temporarily fixed simultaneously with the formation of the temporary fixing portions.

Although the magnetic core portion is formed with the hole to fix the magnetic core portion, the present invention is not limited to the same. The shape of the fixing means is any suitable one, for example, a notch.

Although the surface of the jig used in the load applying procedure is plated with PTFE (Poly Tetra Fluoro Ethylene), the present invention is not limited to the same. If at least a portion, in contact with the magnetic core portion, of the surface of the jig is subjected to arbitrary treatment with a release agent, for example, peening treatment (micro-barrel), the adhesives can be satisfactorily prevented from adhering.

The magnetic core is not limited to one used for a generator. For example, it may be utilized as electromagnetic transducers such as a stepping motor. The magnetic core is not limited to one used as the electromagnetic transducer. For example, it may be used for a receiving antenna used for a radio controlled timepiece or the like, a pressurization coil for a piezoelectric buzzer, a pressurization coil for EL light emission, and so on.

The electromagnetic transducer is not limited to one used for a timepiece. In addition thereto, it may be applied to any suitable electronic device.

The radio wave receiving antenna is not limited to one in which a portion around which a coil is wound is in a linear shape and portions on both sides are formed in a curved shape. For example, the whole of the radio wave receiving antenna may be in a shape curved in a substantially circular arc shape. Alternatively, it may have such a shape that only one of both sides of the portion around which the coil is wound is curved. Also in this case, if the radio wave receiving antenna is arranged along the movement-holder in the timepiece, the space efficiency can be improved.

In short, at least a part of the radio wave receiving antenna may have a shape along the outer shape of the movement-holder in the timepiece.

The electromagnetic transducer may be used for not only the radio wave receiving antenna but also a coil and a coil core of a stepping motor to drive an index of a timepiece, for example.

Furthermore, the electromagnetic transducer is applicable to not only the timepiece but also an arbitrary device as a radio wave receiving or driving source.

Although the best configuration, method, and so forth for implementing the present invention are disclosed in the foregoing description, the present invention is not limited to the same. That is, although the present invention is particularly illustrated and described mainly with respect to particular embodiments, those skilled in the art can make various variations in shapes, materials, quantities, and other structural details for the above embodiments without departing from the technical thoughts and the object of the present invention. Therefore, the description which has limited the shapes, the materials, and so forth disclosed in the foregoing is exemplary in order to make the understanding of the present invention easy and does not limit the present invention. The description in the names of members from which some or all of the limitations of the shapes, the materials, and so forth are removed is included in the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2004-005835, 2004-082710, and 2004-344589. The entire disclosure of each of Japanese Patent Application Nos. 2004-005835, 2004-082710, and 2004-344589 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A method for manufacturing a magnetic core comprising:

forming magnetic core portions in a predetermined shape by pressing a plurality of plate-shaped base materials comprising an amorphous metal;

forming a temporary fixing portion to fix temporarily said magnetic core portions;

laminating said magnetic core portions to fix temporarily said magnetic core portions by said temporary fixing portion together with pressing while forming said magnetic core portions;

fixing temporarily said laminated magnetic core portions; and forming said temporary fixing portion being conducted by bending a part of said magnetic core portions in a direction of plate thickness to form said temporary fixing portion.

2. The method for manufacturing the magnetic core according to claim 1, wherein
forming said magnetic core portions is conducted when laminating said plurality of base materials and pressing said laminated base materials.

3. The method for manufacturing the magnetic core according to claim 1, further comprising
coating at least one surface of said base material with adhesives before forming said magnetic core portions.

4. The method for manufacturing the magnetic core according to claim 3, wherein
coating at least said one surface is conducted by coating a surface having a higher surface accuracy of both surfaces of said base material with said adhesives.

5. The method for manufacturing the magnetic core according to claim 1, wherein
forming said temporary fixing portion is conducted by forming said temporary fixing portion in a shape that allows said temporary fixing portion to be caulked or fitted to said magnetic core portions.

6. The method for manufacturing the magnetic core according to claim 1, wherein
forming said temporary fixing portion is conducted by forming two notches at a peripheral edge of said magnetic core portions and bending said magnetic core portions between said notches in the direction of plate thickness to form said temporary fixing portion.

7. The method for manufacturing the magnetic core according to claim 1, wherein
forming said temporary fixing portion is conducted by forming at least one set of temporary fixing portions opposed to each other at a peripheral edge of said magnetic core portions.

8. The method for manufacturing the magnetic core according to claim 1, wherein
forming said temporary fixing portion forming is conducted by bending said part of said magnetic core portions at a position where a magnetic flux density is lower than a magnetic flux density in a magnetic path formed in said magnetic core portions to form said temporary fixing portion.

9. The method for manufacturing the magnetic core according to claim 1, further comprising
fastening said magnetic core portions to each other by applying heat to harden adhesives which are disposed between any two of said magnetic core portions, after fixing temporarily said laminated magnetic core portions.

10. The method for manufacturing the magnetic core according to claim 9, further comprising
annealing said magnetic core portions within an oxygen-free furnace together when fastening said magnetic core portions.

11. The method for manufacturing the magnetic core according to claim 9, further comprising
annealing said magnetic core portions before forming said magnetic core portions in the predetermined shape.

12. The magnetic core manufacturing method according to claim 1, further comprising
fastening said magnetic core portions each other by applying heat to harden said adhesives which are disposed between any two of said magnetic core portions, after fixing temporarily said laminated magnetic core portions, wherein
fastening including a temporary fixing portion correcting procedure to bend said temporary fixing portion formed by a second bending so that a plane direction thereof coincides with a plane direction of said magnetic core portions.

13. A method for manufacturing a magnetic core comprising:
forming magnetic core portions in a predetermined shape by pressing a plurality of plate-shaped base materials comprising an amorphous metal;
forming a temporary fixing portion to fix temporarily said magnetic core portions;
laminating said magnetic core portions to fix temporarily said magnetic core portions by said temporary fixing portion together with pressing while forming said magnetic core portions;
fixing temporarily said laminated magnetic core portions;
forming said magnetic core portions being conducted by forming a residual base material portion formed of said base material remaining around said magnetic core portions and a connecting portion to connect said magnetic core portions and said residual base material portion; and
fixing temporary said magnetic core portions being simultaneously performed in a cutting step to cut said connecting portion from said magnetic core portions.

14. A method for manufacturing a magnetic core comprising:
forming magnetic core portions in a predetermined shape by pressing a plurality of plate-shaped base materials comprising an amorphous metal;
forming a temporary fixing portion to fix temporarily said magnetic core portions;
laminating said magnetic core portions to fix temporarily said magnetic core portions by said temporary fixing portion together with pressing while forming said magnetic core portions;
fixing temporarily said laminated magnetic core portions;
coating at least one surface of said base material with adhesives before forming said magnetic core portions; and
forming said magnetic core portions including forming a burr due to blanking in while pressing said at least one surface coated with said adhesives.

15. A method for manufacturing a magnetic core comprising:
forming magnetic core portions in a predetermined shape by pressing a plurality of plate-shaped base materials comprising an amorphous metal;
forming a temporary fixing portion to fix temporarily said magnetic core portions;
laminating said magnetic core portions to fix temporarily said magnetic core portions by said temporary fixing portion together with pressing while forming said magnetic core portions;
fixing temporarily said laminated magnetic core portions;
coating at least one surface of said base material with adhesives before forming said magnetic core portions; and
forming said magnetic core portions being conducted by arranging said at least one surface coated with said adhesives opposite a die provided to press.

16. A method for manufacturing a magnetic core comprising:
- forming magnetic core portions in a predetermined shape by pressing a plurality of plate-shaped base materials comprising an amorphous metal;
- forming a temporary fixing portion to fix temporarily said magnetic core portions;
- laminating said magnetic core portions to fix temporarily said magnetic core portions by said temporary fixing portion together with said pressing while forming said magnetic core portions;
- fixing temporarily said laminated magnetic core portions;
- fastening said magnetic core portions to each other by applying heat to harden adhesives which are disposed between any two of said magnetic core portions, after fixing temporarily said laminated magnetic core portions; and
- fastening said magnetic core portions including a load applying procedure to apply a load in a direction in which said laminated magnetic core portions are brought nearer to one another, to make said magnetic core portions adhere to each other.

17. The method for manufacturing the magnetic core according to claim 16, wherein
said load applying procedure is conducted by applying said load to said magnetic core portions by a predetermined jig, and treating at least one surfaces of said jig with a release agent, said at least one surface of said jig contacts said magnetic core portions.

18. A method for manufacturing a magnetic core from plate-like substrates made of metal, the method comprising:
- a first step for forming a first magnetic core portion by pressing a first plate-like substrate, the first magnetic core portion being attached to the first plate-like substrate;
- a second step for forming a second magnetic core portion by pressing a second plate-like substrate, the second magnetic core portion being attached to the second plate-like substrate;
- a third step for forming a first and a second temporary fixing portions by deforming a part of the first and second magnetic core portions respectively in a thickness direction of the first and second magnetic core portions, the first and second temporary fixing portions being for fixing the first magnetic core portion to the second magnetic core portion;
- a fourth step for pressing the first and second magnetic core portions to detach the first and second magnetic core portions from the plate-like substrate; and
- a fifth step for fixing the first magnetic core portion to the second magnetic core portion.

19. The method according to claim 18, wherein
a bonding layer is configured on a surface of the first plate-like substrate.

20. The method according to claim 19, wherein
the surface has higher accuracy than the other surface of the first plate-like substrate, and
the surface is opposite to the other surface.

21. The method according to claim 20, wherein
the fifth step is by heating the first magnetic core portion to set the bonding layer.

22. The method according to claim 19, wherein
the fifth step is by heating the first core magnetic portion to set the bonding layer.

23. The method according to claim 18, wherein
the first and second temporary fixing portions are formed such that the first magnetic core portion is fixed to the second magnetic core portion by caulking or fitting.

* * * * *